United States Patent [19]
Imura

[11] Patent Number: 5,914,777
[45] Date of Patent: Jun. 22, 1999

[54] APPARATUS FOR AND METHOD OF MEASURING A DISTRIBUTION OF LUMINOUS INTENSITY OF LIGHT SOURCE

[75] Inventor: Kenji Imura, Toyohashi, Japan

[73] Assignee: Minolta Co., Ltd., Osaka, Japan

[21] Appl. No.: 09/009,312

[22] Filed: Jan. 20, 1998

[30] Foreign Application Priority Data

Jan. 20, 1997 [JP] Japan ..................................... 9-007979
Apr. 10, 1997 [JP] Japan ..................................... 9-092582

[51] Int. Cl.⁶ ....................................................... G01J 1/02
[52] U.S. Cl. ............................................................. 356/121
[58] Field of Search ............................................. 356/121

[56] References Cited

U.S. PATENT DOCUMENTS 5,729,336  3/1998  Prettyjohns et al. ..................... 356/121
5,818,571  10/1998  Prettyjohns et al. ..................... 356/121

FOREIGN PATENT DOCUMENTS 3-4858  1/1991  Japan .

*Primary Examiner*—F. L. Evans
*Attorney, Agent, or Firm*—Burns, Doane, Swecker & Mathis, LLP

[57] ABSTRACT

An ellipsoidal mirror having an axis of rotational symmetry is disposed so that a first focal point thereof is positioned in vicinity of a measurement area of a light source to be measured. The ellipsoidal mirror reflects parallel light beams from the measurement area onto an optical focal plane on which the reflected light beams are focused, whereby a luminous intensity distribution image of the measurement area is formed on the optical focal plane. The luminous intensity distribution image is directed via a relay lens system onto a sensing surface of an image pickup unit. A distribution of luminous intensity of the measurement area is obtained based on the luminous intensity distribution image.

30 Claims, 21 Drawing Sheets

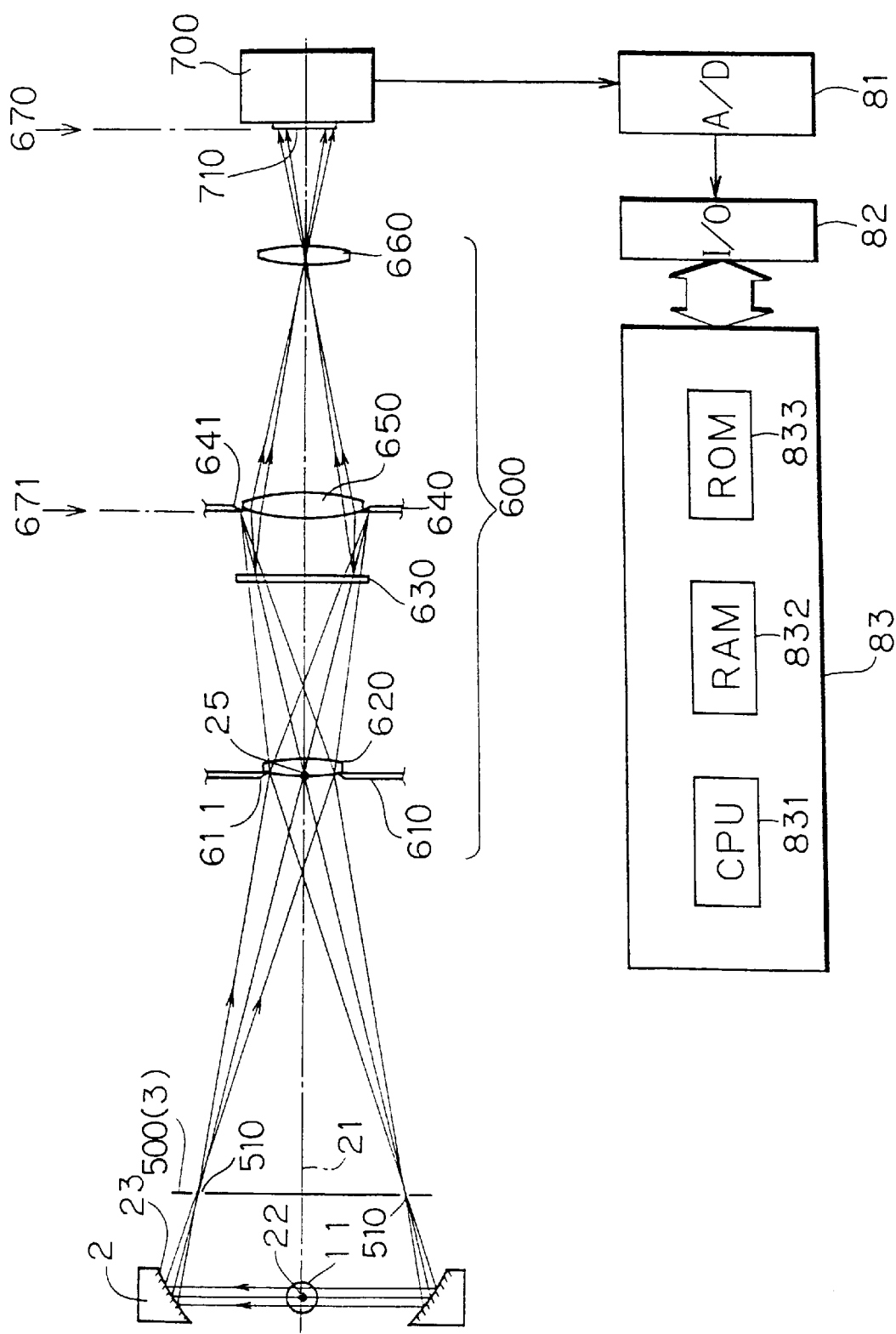

| D(m−1,n−1) | D(m−1,n) | D(m−1,n+1) |
| --- | --- | --- |
| D(m,n−1) | D(m,n) | D(m,n+1) |
| D(m+1,n−1) | D(m+1,n) | D(m+1,n+1) |

APPARATUS FOR AND METHOD OF MEASURING A DISTRIBUTION OF LUMINOUS INTENSITY OF LIGHT SOURCE

BACKGROUND OF THE INVENTION

This application is based on applications Nos. 9-7979 and 9-92582 filed in Japan, the contents of which is hereby incorporated by reference.

1. Field of the Invention

The present invention relates to an apparatus for and a method of measuring a distribution of luminous intensity along each direction of a spot light source such as a halogen lamp or a surface light source such as a CRT or a liquid crystal display (hereinafter, these light sources are collectively referred to as "sample light sources (light sources to be measured)"). The present invention also relates to an apparatus for and a method of measuring a distribution or spectral distribution of luminous intensity along each direction of a spot light source such as a halogen lamp, a partial area of a surface light source such as a CRT or a liquid crystal display, or a fine area illuminated by an illumination means (hereinafter, these light source and areas are collectively referred to as "measurement area") for each wavelength.

2. Description of the Background Art

A distribution of luminous intensity is one of the important light source characteristics, and a variety of apparatuses for measuring the distribution of luminous intensity have been proposed. For example, Japanese Examined Patent Publication No. 3-4858 discloses a luminous intensity distribution measuring apparatus in which a sample light source is arranged at a front focal point of an f·θ lens, an aerial image of the sample light source is formed on a plane where a rear focal point of the f·θ lens is located, and an image of the distribution of luminous intensity (hereinafter, "luminous intensity distribution image") of the sample light source is observed by directing the aerial image on a sensing surface of a television image pickup device via a relay lens system.

A measurable range is crucial in measuring the distribution of luminous intensity of the sample light source. The distribution of luminous intensity characteristic of the liquid crystal display as one of the sample light sources has been improved in recent years. In order to estimate this improved liquid crystal display, it is necessary to measure a distribution of luminous intensity over a range of at least ±80° with respect to a normal line to each fine area (measurement area) of the liquid crystal display.

However, since the luminous intensity distribution image of the sample light source is formed using the f·θ lens in the above prior art, the measurable range is inevitably limited to a range of ±60° with respect to the normal line to the measurement area of the sample light source. It is difficult at present to meet a recent demand for the luminous intensity distribution measuring apparatuses.

Further, since the transmittance of polarized light components of an incident light on a lens varies depending on an incidence angle as has been known, it is difficult to conduct an accurate measurement by the prior art which measures a distribution of luminous intensity via the f·θ lens. For example, if light having the same luminous intensity is emitted from the measurement area at different angles θ1, θ2 with respect to the normal line to the measurement area, the intensity of the lights transmitting the f·θ lens changes according to the angles θ1, θ2 due to the nonuniform transmittance. This problem is particularly evident if the sample light source is a liquid crystal display which is a light source for irradiating polarized lights.

There is also known a method for measuring a distribution of luminous intensity of the sample light source by arranging a photodetector such as a multiplier phototube or photodiode in a position distanced from the sample light source and by detecting the luminous intensity in the respective moving positions while the photodetector is successively moved along a concentric circle with respect to the sample light source. According to this method, the above problem can be solved, but another crucial problem is caused.

Specifically, in order to conduct a luminous intensity distribution measurement with high accuracy according to this method, it is necessary to increase measurement points by repeatedly moving the photodetector and the measurement many times. Accordingly, it takes a longer time to conduct a measurement. Further, since the measurements cannot be simultaneously conducted at all measurement points according to this method, it is requisite that the sample light source be stable from the start to the end of the measurement. Actually, it is impossible to measure the distribution of luminous intensity of the sample light source with high accuracy.

Furthermore, in order to estimate a CRT or liquid crystal display for displaying a color image, it is important to measure a distribution of luminous intensity which includes a color information and is actually observed by a human being, in other words, a spectral distribution of luminous intensity.

SUMMARY OF THE INVENTION

In view of the above problems, it is an object of the present invention to provide a luminous intensity distribution measuring apparatus capable of measuring a distribution of luminous intensity of a sample light source with high accuracy.

It is another object of the present invention to provide a luminous intensity distribution measuring apparatus capable of measuring a spectral distribution of luminous intensity of a sample light source with high accuracy.

According to one aspect of the present invention, there is provided an apparatus for measuring a distribution of luminous intensity of a light source having a measurement area to be measured. The apparatus comprises: an ellipsoidal mirror having an axis of rotational symmetry, and including an ellipsoidal reflection surface having first and second focal points, the ellipsoidal mirror being disposed so that the first focal point is positioned in vicinity of the measurement area, the ellipsoidal mirror reflecting parallel light beams from the measurement area onto an optical focal plane on which the reflected light beams are focused, whereby a luminous intensity distribution image of the measurement area is formed on the optical focal plane; an image pickup unit including a sensing surface for sensing the luminous intensity distribution image formed on the optical focal plane; and a calculator for obtaining a distribution of luminous intensity of the measurement area based on the luminous intensity distribution image sensed by the image pickup unit.

The apparatus may comprises: an ellipsoidal mirror having an axis of rotational symmetry, and including an ellipsoidal reflection surface first and second focal points, the ellipsoidal mirror being disposed so that the first focal point is positioned in vicinity of the measurement area, the ellipsoidal mirror reflecting parallel light beams from the measurement area onto an optical focal plane on which the reflected light beams are focused, whereby a luminous intensity distribution image of the measurement area is formed on the optical focal plane; a member disposed on the optical focal plane, the member including an aperture which has the shape corresponding to the luminous intensity distribution image formed on the optical focal plane; a dispersed image forming optical system for dispersing light beams, which is emitted from the measurement area, reflected from the ellipsoidal mirror, and then passes the aperture, to form a dispersed image of the luminous intensity distribution image on a predetermined image-forming position, the dispersed image forming optical system including an incident section located in vicinity of the second focal point, an image pickup unit including a sensing surface for sensing the dispersed image, the image pickup unit being disposed so that a sensing surface is located on the image-forming position; and a calculator for obtaining a spectral distribution of luminous intensity of the measurement area based on the dispersed image sensed by the image pickup unit.

According to another aspect of the present invention, there is provided a method of measuring a distribution of luminous intensity of a light source having a measurement area to be measured. The method comprises the steps of: preparing an ellipsoidal mirror having an axis of rotational symmetry, and including an ellipsoidal reflection surface having first and second focal points; disposing the ellipsoidal mirror so that the first focal point is positioned in vicinity of the measurement area to reflect parallel light beams from the measurement area onto an optical focal plane on which the reflected light beams are focused, whereby a luminous intensity distribution image of the measurement area is formed on the optical focal plane; sensing the luminous intensity distribution image formed on the optical focal plane; and obtaining a distribution of luminous intensity of the measurement area based on the sensed luminous intensity distribution image.

The method may comprises the steps of: preparing an ellipsoidal mirror having an axis of rotational symmetry, and including an ellipsoidal reflection surface having first and second focal points; disposing the ellipsoidal mirror so that the first focal point is positioned in vicinity of the measurement area to reflect parallel light beams from the measurement area onto an optical focal plane on which the reflected light beams are focused, whereby a luminous intensity distribution image of the measurement area is formed on the optical focal plane; disposing a member on the optical focal plane, the member including an aperture which has the shape corresponding to the luminous intensity distribution image formed on the optical focal plane; dispersing light beams, which is emitted from the measurement area, reflected from the ellipsoidal mirror, and then passes the aperture, to form a dispersed image of the luminous intensity distribution image on a predetermined image-forming position; sensing the dispersed image; and obtaining a spectral distribution of luminous intensity of the measurement area based on the sensed dispersed image.

These and other objects, features and advantages of the present invention will become more apparent upon a reading of the following detailed description and accompanying drawings.

BRIEF DESCRIPTION OF THE DRAWINGS

FIG. 11 is a diagram showing the optical and electrical constructions of a fourth embodiment of the luminous intensity distribution measuring apparatus according to the present invention.

DESCRIPTION OF THE PREFERRED EMBODIMENTS

A. First Embodiment

Figure 1:
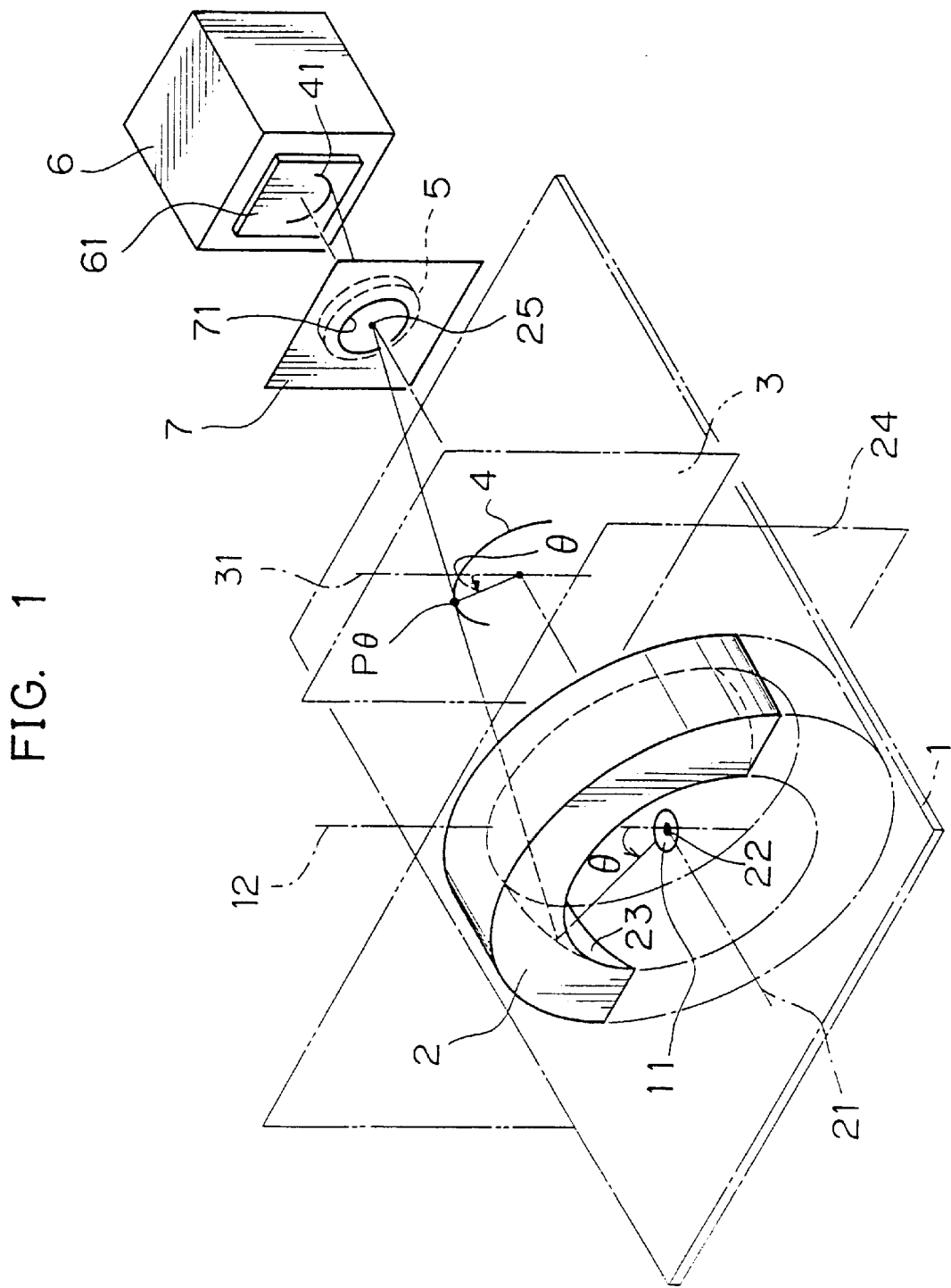
FIG. 1 is a perspective view of an optical construction of a first embodiment of a luminous intensity distribution measuring apparatus according to the present invention.
Figure 2:
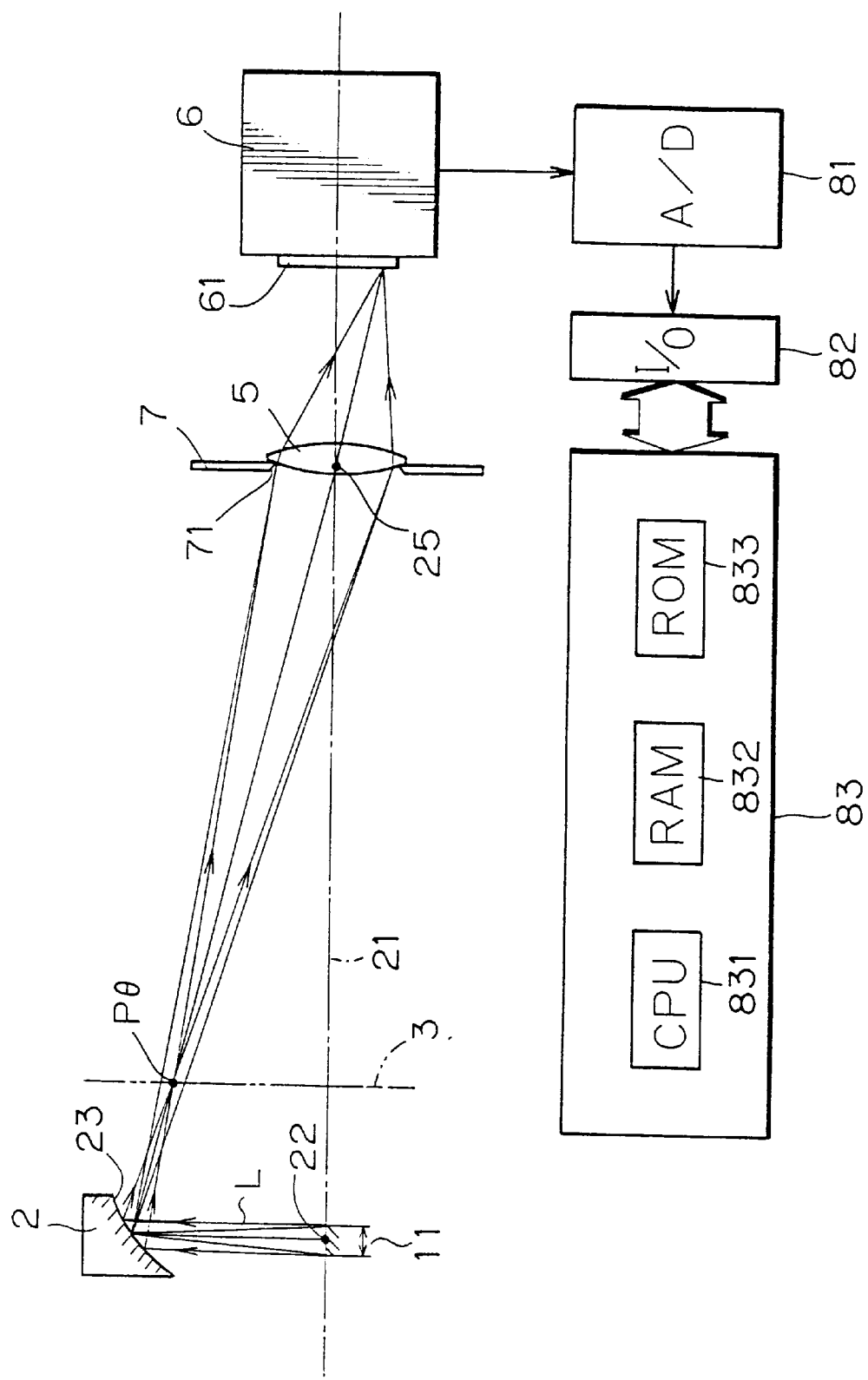
FIG. 2 is a diagram showing the optical and electrical constructions of the first embodiment.

FIGS. 1 and 2 are diagrams showing a first embodiment of a luminous intensity distribution measuring apparatus according to the present invention. FIG. 1 shows an optical construction, whereas FIG. 2 shows the optical and electrical constructions. This is an apparatus for measuring a distribution of luminous intensity in a fine area (measurement area) 11 of a surface light source (sample light source) 1 such as a liquid crystal display.

Figure 3:
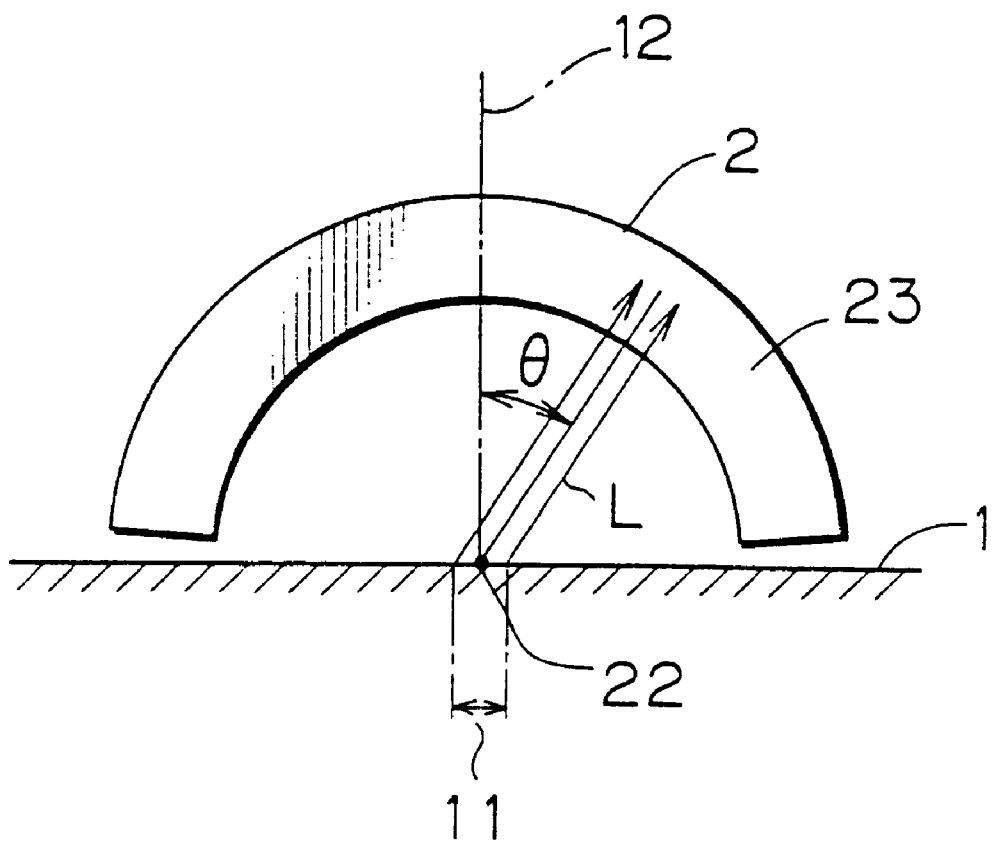
FIG. 3 is a front view of an ellipsoidal mirror viewed from an optical focal plane side.

This luminous intensity distribution measuring apparatus is provided with a semiannular ellipsoidal mirror 2. This ellipsoidal mirror 2 has an axis of rotational symmetry 21 and is arranged such that a first focal point 22 thereof is positioned in vicinity of the measurement area 11. An ellipsoidal reflection surface 23 of the ellipsoidal mirror 2 has a specified width in a parallel direction with the axis of rotational symmetry 21, and intersects a virtual plane on which the first focal point 22 is located and orthogonal to the axis 21. Thus, a light irradiating from the measurement area 11 is reflected from the ellipsoidal reflection surface 23 and focused at a second focal point 25. Further, in this embodiment, the ellipsoidal reflection surface 23 extends over 180° about the axis of rotational symmetry 21. Thus, parallel light beams L (see FIG. 3) irradiating in a direction at an angle θ to a normal line 12 of the measurement area 11 are reflected from the ellipsoidal reflection surface 23, and are focused at a point Pθ which is at the angle θ to a normal line 31 extending in parallel with the normal line 12 on a focal plane 3. Accordingly, the parallel light beams L irradiating from the measurement area 11 within a range of ±90° with respect to the normal line 12 are focused in a corresponding position on the focal plane 3 by the ellipsoidal mirror 2, with the result that a semicircular luminous intensity distribution image 4 of the measurement area 11 is formed on the focal plane 3. In this specification, the focal plane 3 on which the parallel light beams L from the measurement area 11 are gathered is particularly referred to as an "optical focal plane" in order to clearly distinguish the two focal points 22, 25 of the ellipsoidal reflection surface 23 and the focal plane 3.

Further, the luminous intensity distribution measuring apparatus is provided with a relay lens system 5 in vicinity of the second focal point 25. The relay lens system 5 directs the luminous intensity distribution image 4 formed on the optical focal plane 3 onto a sensing surface 61 of an image pickup device 6. Accordingly, the luminous intensity distribution image 4 can be enlarged or reduced at a specified ratio or projected as it is on the sensing surface 61 by adjusting the magnification of the relay lens system 5. In this embodiment, as is clear from FIG. 1, the luminous intensity distribution image 4 on the optical focal plane 3 is projected on the sensing surface 61 by the relay lens system 5 while being reduced, and sensed by the image pickup device 6. It should be noted that the luminous intensity distribution image 4 may be directly sensed by the sensing surface 61 of the image pickup device 6 arranged in the position of the optical focal plane 3 without providing the relay lens system 5.

Further, in this embodiment, an aperture plate 7 formed with an aperture 71 corresponding to the measurement area 11 is arranged in vicinity of the front side of the relay lens system 5. By providing this aperture plate 7, the measurement area 11 is determined. In other words, the aperture plate 7 functions to define a field stop. The position of the aperture plate 7 is limited to the position in vicinity of the front side of the relay lens system 5, but may be a position in vicinity of the rear side thereof. In the case that the measurement area 11 is actually determined by an outer frame (not shown) of the relay lens system 5 and the like, it is not necessary to provide the aperture plate 7.

Next, the electrical construction of the luminous intensity distribution measuring apparatus will be described with reference to FIG. 2. In this apparatus, an analog-to-digital (A/D) converter 81 is connected with the image pickup device 6. After being A/D converted, an image information corresponding to the luminous intensity distribution image 4 sensed by the image pickup device 6 is inputted to an operational controller 83 via an I/O 82. The operational controller 83 includes a CPU 831 for calculating a distribution of luminous intensity of the measurement area 11 based on the image information corresponding to the luminous intensity distribution image 4, a RAM 832 for temporarily storing the image information and a ROM 833 for storing programs to be described later in advance. The distribution of luminous intensity of the measurement area 11 is calculated based on the luminous intensity distribution image 4 as follows.

Figure 4:
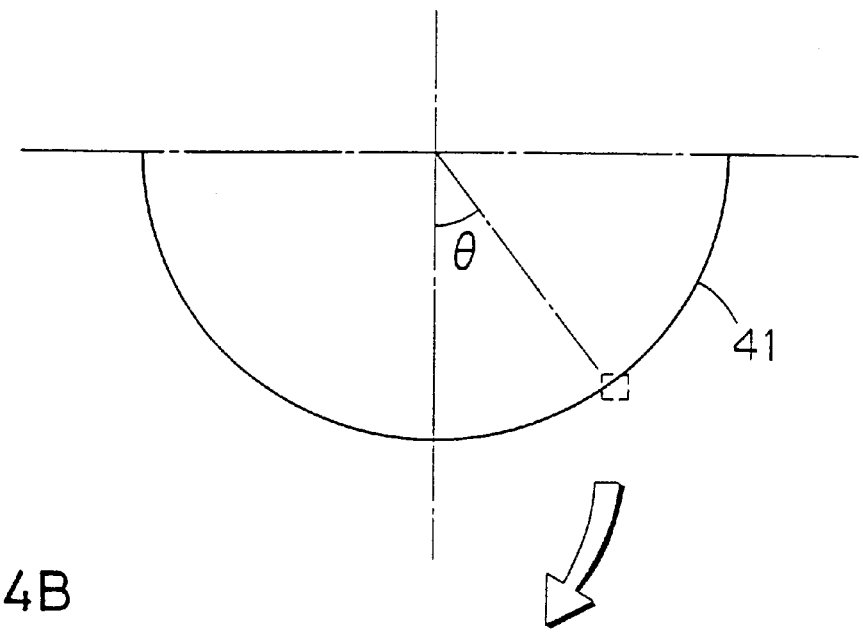
FIGS. 4A and 4B are schematic diagrams showing a correspondence between a memory space corresponding to a pixel constituting a sensing surface and an intensity distribution image projected on the sensing surface.

FIGS. 4A and 4B are diagrams showing a correspondence between a memory space corresponding to pixels constructing the sensing surface 61 and a luminous intensity distribution image 41 formed on the sensing surface 61. This memory space is defined by arranging a plurality of pieces of image information in a matrix manner. In the operational controller 83, a 3×3 image data (FIG. 4B) corresponding to a part of the luminous intensity distribution image 41, e.g. to a portion of the luminous intensity distribution image 41 at the angle θ to the normal line extending in parallel with the normal line 12 of the measurement area 11 is read from the RAM 832, and an integral value of nine image data D(m−1, n−1), . . . , D(m+1, n+1) is obtained as a luminous intensity to the angle θ. The above processing is applied to all portions within the range of ±90° to the normal line to calculate a linear distribution of luminous intensity of the measurement area 11. The form of the image data which corresponds to the luminous intensity distribution image 41 and is to be read is not limited to a 3×3 matrix, but is any arbitrary form. Although the integral value is obtained as the luminous intensity to the angle θ here, any other specific value (e.g. an average value) may be obtained as such. As described above, according to the first embodiment, the distribution of luminous intensity of the measurement area 11 can be measured within the range of ±90° with respect to the normal line 12 and, therefore, a liquid crystal display or like sample light source 1 which has been improved in recent years can be estimated. Further, since the luminous intensity distribution image 4 is formed by reflecting the light beams L from the measurement area 11 by the ellipsoidal reflection surface 23 which is symmetrically shaped with respect to the axis of rotational symmetry 21, the incidence angles of the light beams L on the ellipsoidal reflection mirror 23 are same at any angle to the normal line 12, and the incidence angles thereof on the relay lens system 5 are same. In addition, even if the sample light source 1 is a polarized light source, the light beams advancing in apparatus have the same relationship between the axis and plane of polarization. Thus, the distribution of luminous intensity of the polarized light source can be measured with high accuracy without depending on the angle θ. Furthermore, in this embodiment, the luminous intensity distribution image 4(41) is sensed within the range of ±90° with respect to the normal line 12 at the same time. Accordingly, the distribution of luminous intensity can be measured with high accuracy without being influenced by a change of the light source over time.

In the first embodiment, the linear distribution of luminous intensity is measured. However, a two-dimensional distribution of luminous intensity of the measurement area 11 can be measured by successively measuring the linear distribution of luminous intensity in each rotational position as described above while integrally rotating the ellipsoidal mirror 2, the relay lens system 5, the image pickup device 6 and the aperture plate 7 about the normal line 12 of the measurement area 11 with respect to the measurement area 11. The luminous intensity distribution measuring apparatus capable of measuring such a two-dimensional distribution of luminous intensity will be described in detail as a second embodiment below.

B. Second Embodiment

Figure 5:
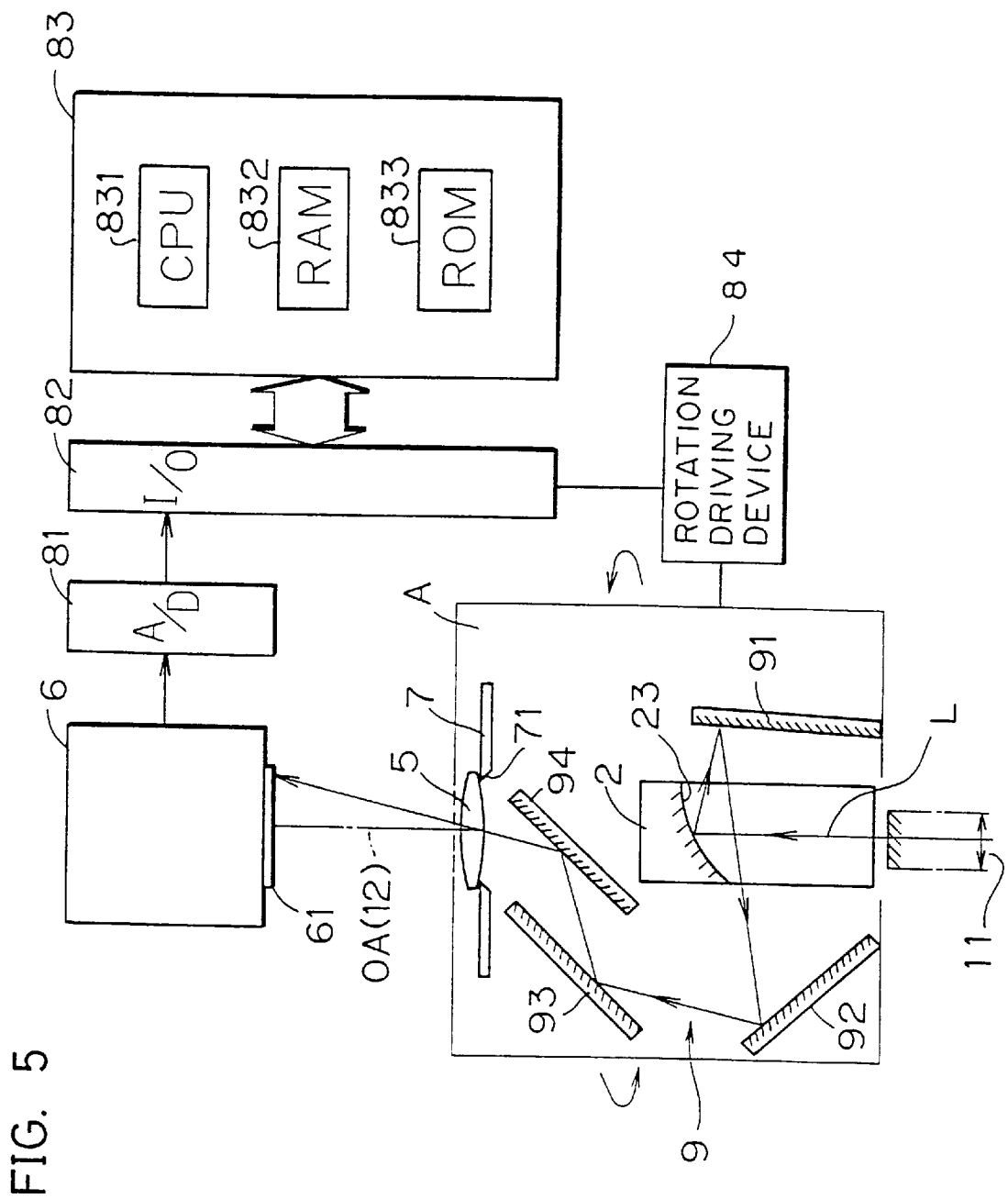
FIG. 5 is a diagram of a second embodiment of the luminous intensity distribution measuring apparatus according to the present invention.

FIG. 5 is a diagram showing a second embodiment of the luminous intensity distribution measuring apparatus according to the present invention. The luminous intensity distribution measuring apparatus according to the second embodiment largely differs from the first embodiment in the following three points.

The first point is that the image pickup device 6 is fixed on the normal line 12 of the measurement area 11 in the second embodiment unlike the first embodiment in which the image pickup device 6 is provided on the axis of rotational symmetry 21.

The second point is that a reflecting optical system 9 including four reflection mirrors 91 to 94 is provided between the ellipsoidal mirror 2 and the relay lens system 5. The reflection mirrors 91 to 94 successively reflect light beams L reflected by the ellipsoidal reflection surface 23 so that an optical axis OA extending toward the image pickup device 6 finally substantially coincides with the normal line 12 of the measurement area 11.

The third point is that an assembly A of the ellipsoidal mirror 2, the reflecting optical system 9 and the relay lens system 5 is integrally rotatable about the normal line 12 of the measurement area 11 and that the assembly A is rotated by a rotation driving device 84.

No description is given on the other construction because it is same as the already described first embodiment.

In the thus constructed luminous intensity distribution measuring apparatus, parallel light beams L from the measurement area 11 are reflected from the ellipsoidal mirror 2, and a semicircular luminous intensity distribution image is formed on the optical focal plane (not shown in FIG. 5) while being reflected from the reflecting optical system 9. The light beams L are introduced to the relay lens system 5 arranged at the second focal point by the reflecting optical system 9, and the luminous intensity distribution image is formed on the sensing surface 61, thereby enabling the measurement of a linear distribution of luminous intensity similar to the first embodiment.

Since the linear distribution of luminous intensity can be successively measured in the respective rotational positions while the assembly A is rotated about the normal line 12 of the measurement area 11 in the second embodiment, a two-dimensional distribution of luminous intensity of the measurement area 11 can be measured by this luminous intensity distribution measuring apparatus.

Since the image pickup device 6 is fixed and only the assembly A is rotated in the second embodiment, an electric wiring connected with the image pickup device 6 can also be fixed, realizing the following effect. Specifically, as described above, the two-dimensional distribution of luminous intensity of the measurement area 11 becomes measurable by modifying the apparatus according to the above first embodiment, that is adopting a construction that the ellipsoidal mirror 2, the relay lens system 5, the image pickup device 6 and the aperture plate 7 are integrally rotated about the normal line 12 of the measurement area 11. However, in the modification that the image pickup device 6 is rotated, the electric wiring connected therewith is displaced according to the rotation. Thus, it is necessary to apply a special wiring processing. As opposed to this, in the second embodiment, the two-dimensional distribution of luminous intensity can be measured while the image pickup device 6 is fixed by coinciding the optical axis OA extending toward the image pickup device 6 with the normal line 12 of the measurement area 11. Therefore, wire(s) connected with the image pickup device 6 can also be connected, obviating the need for a special wiring processing.

In the case that the inventive luminous intensity distribution measuring apparatus is rotated about the normal line 12 of the measurement area 11 and the linear distribution of luminous intensity is successively measured in the respective rotational positions to measure the two-dimensional distribution of luminous intensity as in the second embodiment, the values of the transmittance of the optical systems differ in the respective rotational positions for the following reasons. One reason is that there is a time delay between the measurements in the respective rotational positions and the other reason is that, if the sample light source is a polarized light source, a relationship between the axis of polarization and the respective incidence surfaces located on the optical path being from the ellipsoidal mirror to the image pickup device 6, changes depending on the rotational positions. However, since the luminous intensity along the normal line direction is constantly measured in the respective rotational positions, the time delay and the influence of the polarized light can be avoided by applying a normalization such that the luminous intensities along the normal line direction become equal in the respective rotational positions.

C. Third Embodiment

Figure 6:
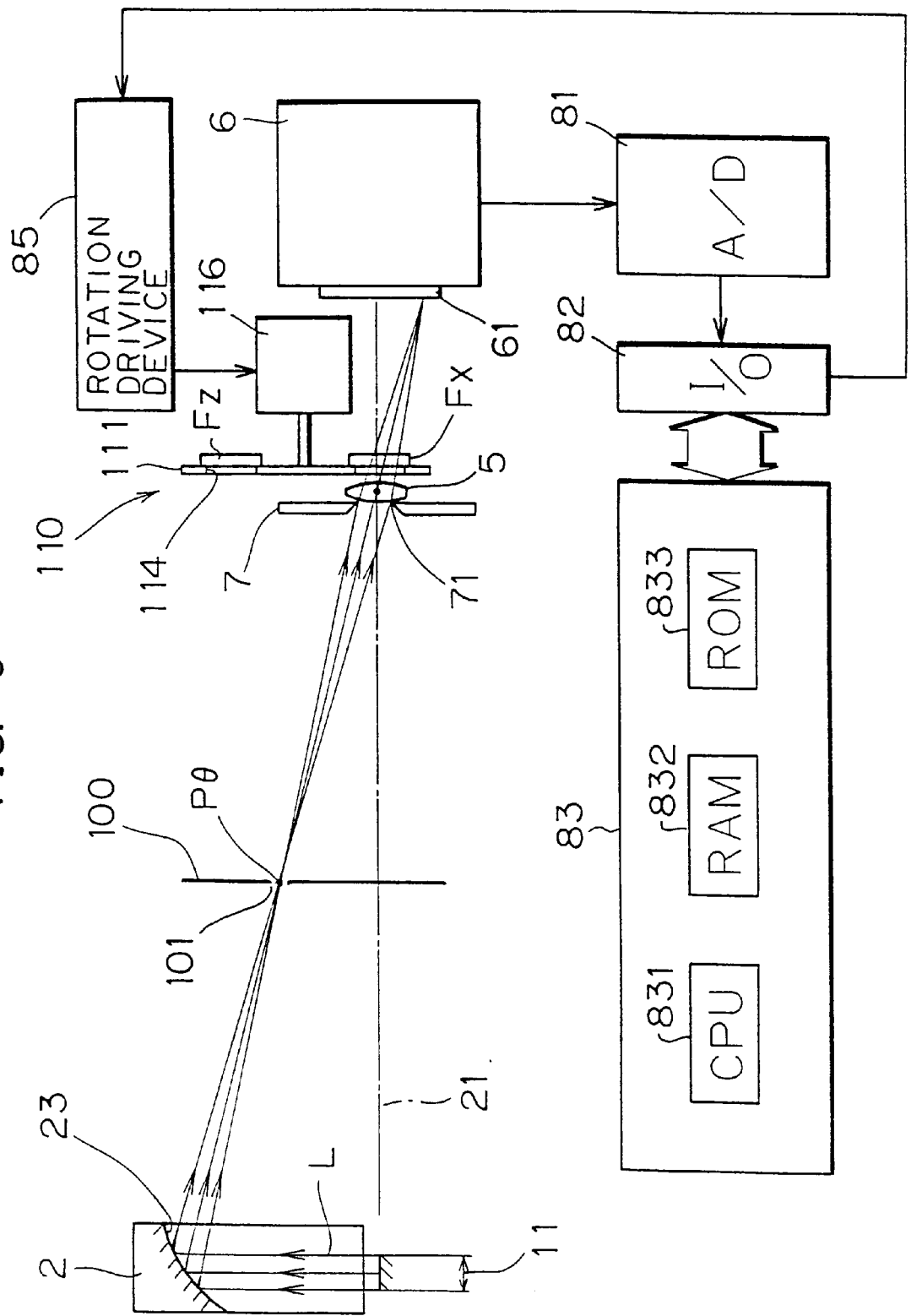
FIG. 6 is a diagram of a third embodiment of the luminous intensity distribution measuring apparatus according to the present invention.

FIG. 6 is a diagram of a third embodiment of the luminous intensity distribution measuring apparatus according to the present invention. This luminous intensity distribution measuring apparatus is basically identical to that of the first embodiment except the following points. Here, only the different construction is described in detail by giving no description on the common construction with the first embodiment by identifying by the same reference numerals.

Figure 7:
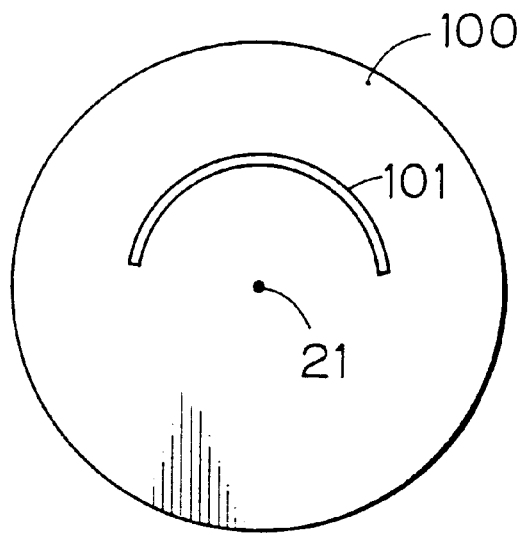
FIG. 7 is a front view of an aperture plate.

First, an aperture plate 100 (FIG. 7) having an aperture 101 is arranged on the optical focal plane 3 in this luminous intensity distribution measuring apparatus. The aperture 101 has a semicircular shape so as to meet the shape of the luminous intensity distribution image 4. The luminous intensity distribution image 4 is formed on the sensing surface 61 via the aperture 101 and the relay lens system 5, whereas the light beams L outside the luminous intensity distribution image 4 are shut off by the aperture plate 100. Accordingly, only the luminous intensity distribution image 4(41) is formed on a specific position of the sensing surface 61 (a position where a luminous intensity distribution image of FIG. 10B to be described later is formed).

In this luminous intensity distribution measuring apparatus, a filter switching device 110 is provided between the relay lens system 5 and the image pickup device 6 as shown in FIG. 6. The filter switching device 110 selectively positions one of filters Fx, Fy, Fz having three different spectral transmittances in accordance with sensitivities x, y, z of a standard observer recommended by the Commission International de l'Eclairage (CIE) on the optical axis, thereby enabling the image pickup device 6 to sense the luminous intensity distribution image 4(41) at the respective spectral sensitivities.

Figure 8:
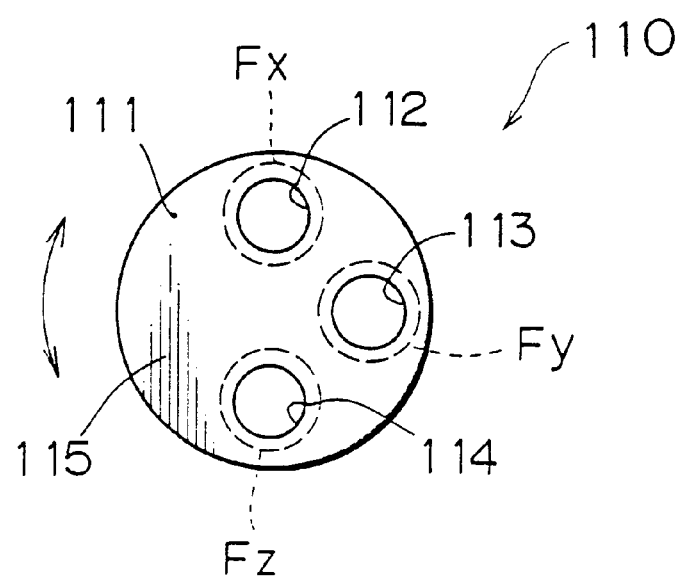
FIG. 8 is a front view of a filter switching device.

FIG. 8 is a front view of the filter switching device 110. The filter switching device 110 is provided with a rotary disk member 111. Three through holes 112, 113, 114 are formed in the disk member 111 in three of four equally spaced positions on a concentric circle. The filters Fx, Fy, Fz are respectively mounted on these through holes 112, 113, 114. Further, a motor 116 is coupled with this disk member 111. Upon the activation of the motor 116 in response to a signal from the rotation driving device 85, the disk member 111 rotates and one of the filters Fx, Fy, Fz is selectively located on the optical axis. No through hole is formed in an area 115 corresponding to the remaining one of the four equally spaced positions, so that when the area 115 is positioned on the optical axis by the motor 116, the light beams emerging from the relay lens system 5 is blocked by the area 115. In other words, this area 115 functions as a light blocking area and realizes a mechanism shutter by being moved to and retracted from the optical axis.

Since the luminous intensity distribution image 4(41) is sensed via the filters Fx, Fy, Fz, the signal-to-noise ratio thereof is reduced by the image pickup device 6. In order to produce the filters Fx, Fy, Fz in accordance with the sensitivities x, y, z of the CIE, it is necessary to combine a plurality of filters and therefore the transmittances of the filters Fx, Fy, Fz are reduced to as low as about 20%. In the third embodiment, in order to measure the distribution of luminous intensity of not only high luminance sample light sources, but also of low luminance sample light sources, a cooling type full frame CCD is adopted as the image pickup device 6. A color distribution of luminous intensity is obtained by measuring a distribution of luminous intensity for each spectral sensitivity by converting an analog output from the full frame CCD 6 into 12-bit digital data by an A/D converter 81, sending the obtained digital data to an operational controller 83 via an I/O 82, and performing a calculation to be described next.

Figure 9:
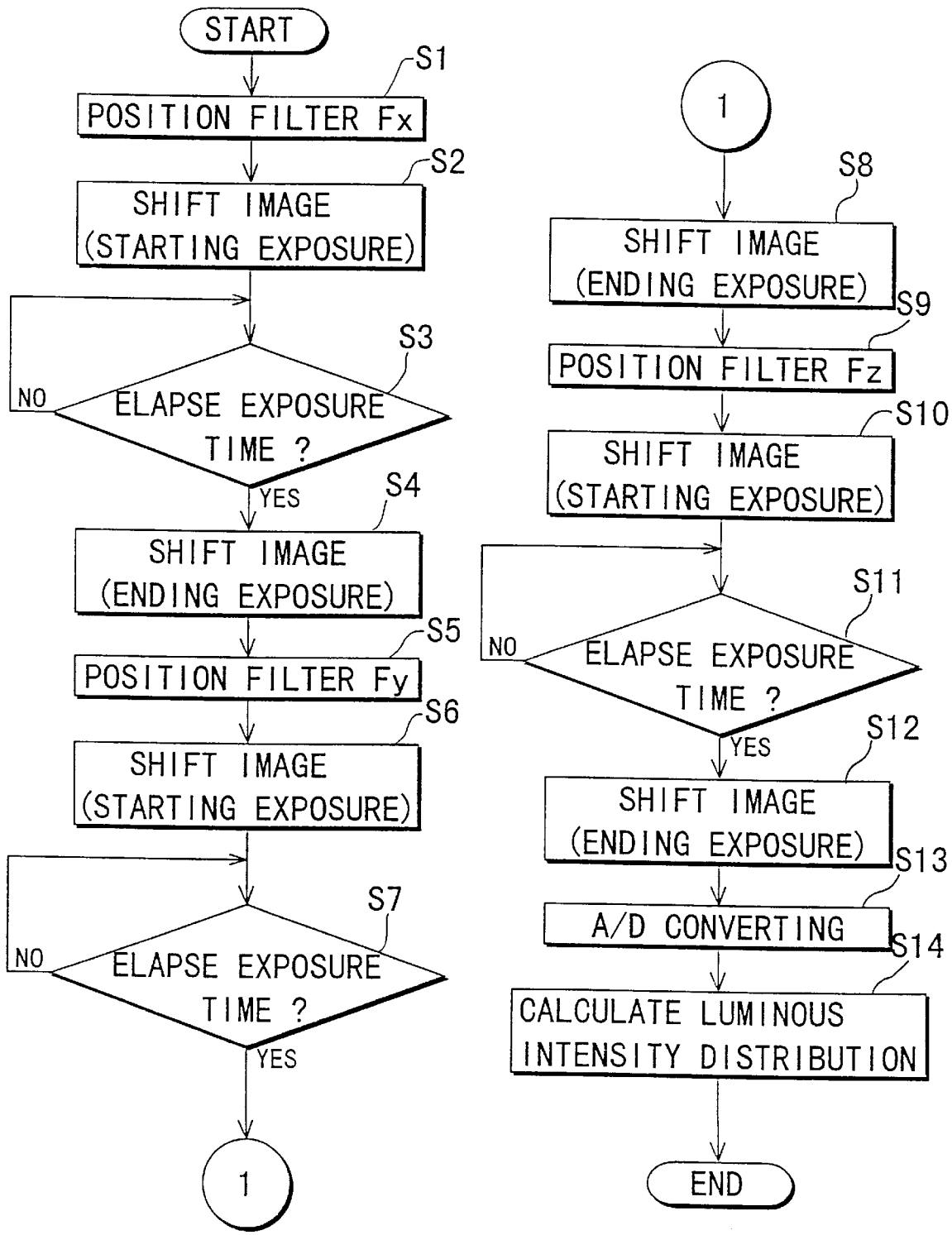
FIG. 9 is a flow chart showing the operation of the luminous intensity distribution measuring apparatus according to the third embodiment.

FIG. 9 is a flow chart showing the operation of the luminous intensity distribution measuring apparatus according to the third embodiment, and FIG. 10 is a diagram showing the operation of this apparatus. In an initial state of this luminous intensity distribution measuring apparatus, the light blocking area 115 is positioned on the optical axis.

Figure 10A:
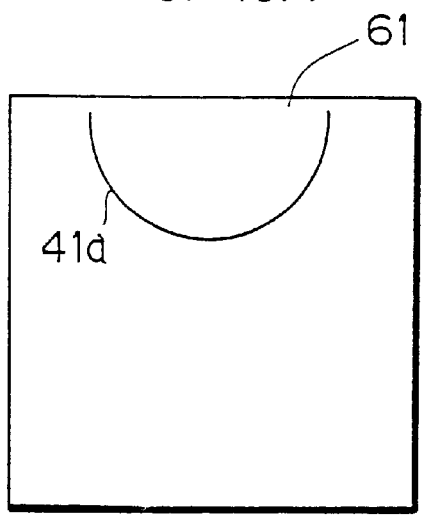
FIGS. 10A to 10F are diagrams showing the operation of the apparatus of FIG. 6.

When the luminous intensity distribution measurement of the measurement area 11 is started by turning on the sample light source 1, the motor 116 is driven upon the receipt of the signal from the rotation driving device 85, thereby positioning the filter Fx on the optical axis (Step S1). Accordingly, the light beams irradiating from the measurement area 11 are reflected from the ellipsoidal reflection surface 23 of the ellipsoidal mirror 2 and gathered on the aperture 101 of the aperture plate 100 to form the luminous intensity distribution image 4. Further, the luminous intensity distribution image 4 is projected on the sensing surface 61 of the full frame CCD 6 at the spectral sensitivity of the filter Fx, thereby forming an electric charge image 41a corresponding to the luminous intensity distribution image 41 in a specific position of the sensing surface 61 (FIG. 10A).

Here, exposure is started by positioning the filter Fx instead of the light blocking area 115. In other words, an exposure control is possible by the mechanical shutter by the filter switching device 110. The luminous intensity distribution image 4(41) is sensed with the spectral sensitivity of the filter Fx by continuing the exposure for a predetermined time. Then, the filter Fx is replaced by the filter Fy in a similar manner and the luminous intensity distribution image 4(41) is sensed with the spectral sensitivity of the filter Fy. Finally, the filter Fy is replaced by the filter Fz and the luminous intensity distribution image 4(41) is sensed with the spectral sensitivity of the filter Fz.

However, with the mechanical shutter, there is a time delay caused by the switching of the filters, making the image sensing unstable. Accordingly, an electronic shutter is adopted in this embodiment as described below in order to more accurately sense the luminous intensity distribution image 4(41) with the respective spectral sensitivities.

Figure 10B:
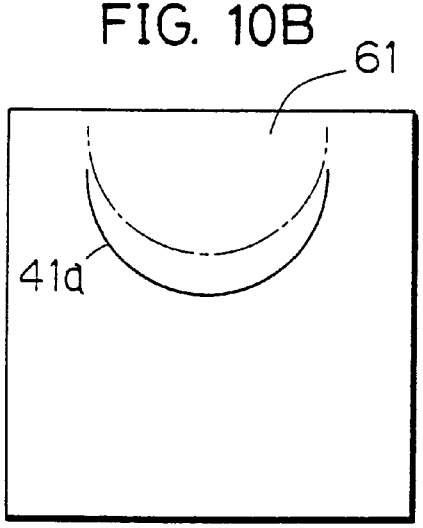
Figure 10C:
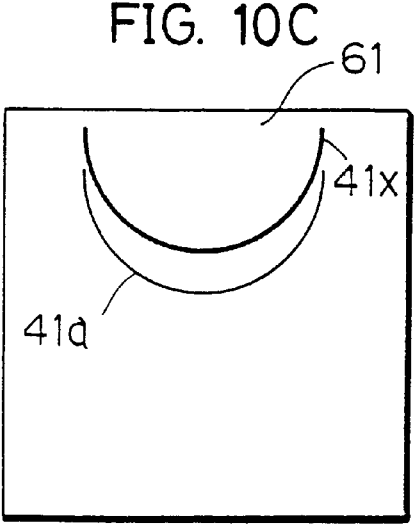

Specifically, in Step S2, electric charges are shifted in parallel on the sensing surface 61 in a specified direction (a downward direction in this embodiment) by a specified number of rows of pixels. Then, as shown in FIG. 10B, the electric charge image 41a is shifted from a position where the luminous intensity distribution image 4(41) indicated by phantom line is formed (hereinafter, "luminous intensity distribution image forming position"), and the pixels in the luminous intensity distribution image forming position are cleared. As time elapses, electric charges are stored in the pixels corresponding to the luminous intensity distribution image forming position, thereby forming an electric charge image 41x corresponding to the luminous intensity distribution image 41 (see FIG. 10C). In other words, the exposure of the luminous intensity distribution image 41 with the spectral sensitivity of the filter Fx is started by the electric charge shift.

Figure 10D:
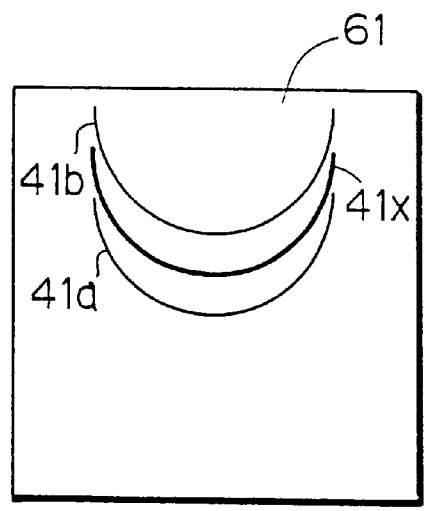

Upon the elapse of a specified exposure time (YES in Step S3), electric charges are shifted in parallel downward on the sensing surface 61 by a specified number of rows of pixels similar to Step S2 (Step S4). This results in the parallel downward displacement of the electric charge images 41a, 41x as shown in FIG. 10D and the temporary clearing of the pixels in the luminous intensity distribution image forming position. Thereafter, as time elapses, electric charges are stored in the pixels corresponding to the luminous intensity distribution image forming position, thereby forming an electric charge image 41b. However, the electric charge image 41x remains as an electric charge image formed till the end of the exposure (Step S4) after the start of the exposure (Step S2) without being influenced at all. In other words, the electric charge shifting functions as a shutter.

Figure 10E:
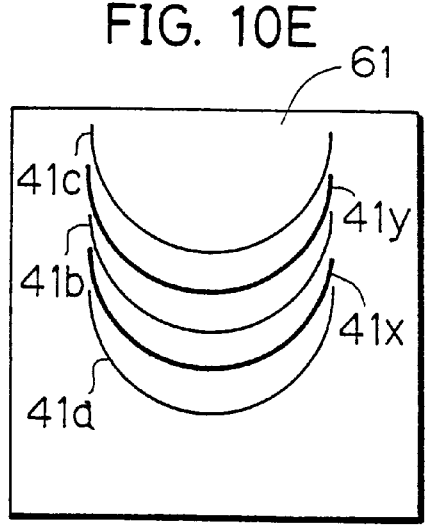

When the exposure corresponding to the spectral sensitivity of the filter Fx is completed as above, the same operations of Step S1 to S4 are repeated. Specifically, the motor 116 is driven again to position the filter Fy on the optical axis instead of the filter Fx (Step S5). Thereby, the luminous intensity distribution image 4(41) is formed on the sensing surface 61 of the full frame CCD 6 with the spectral sensitivity of the filter Fy. In Step S6, electric charges are shifted in parallel downward on the sensing surface 61 by a specified number of rows of pixels, thereby starting an exposure with the spectral sensitivity of the filter Fy. Upon the elapse of the predetermined exposure time (YES in Step S7), the exposure is completed by shifting the electric charges in parallel downward by the specified number of rows of pixels (Step SB). By performing a series of operations (Steps S5 to S8), electric charge images 41y, 41c are formed on the sensing surface 61 in parallel with the electric charge images 41a, 41x and 41b in an upward direction as shown in FIG. 10E.

Figure 10F:
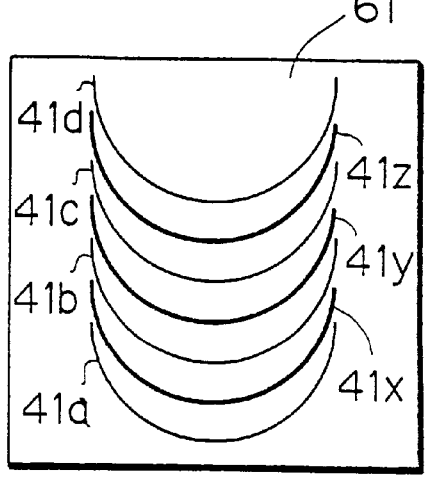

When the exposure corresponding to the spectral sensitivity of the filter Fy is completed as described, operations similar to those above are repeated. Specifically, the motor 116 is driven again to position the filter Fz on the optical axis instead of the filter Fy (Step S9). Thereby, the luminous intensity distribution image 4(41) is formed on the sensing surface 61 of the full frame CCD 6 with the spectral sensitivity of the filter Fz. In Step S10, electric charges are shifted in parallel downward on the sensing surface 61 by a specified number of rows of pixels, thereby starting an exposure with the spectral sensitivity of the filter Fz. Upon the elapse of the predetermined exposure time (YES in Step S11), the exposure is completed by shifting the electric charges in parallel downward by the specified number of rows of pixels (Step S12). By performing a series of operations (Steps S9 to S12), electric charge images 41z, 41d are formed on the sensing surface 61 in parallel with the electric charge images 41a, 41x, 41b, 41y and 41c in an upward direction as shown in FIG. 10F.

Upon the formation of the luminous intensity distribution electric charge images 41x, 41y, 41z on the sensing surface 61 of the full frame CCD 6 with three different spectral sensitivities, the motor 116 is driven again to position the light blocking area 115 instead of the filter Fz. Thereafter, all electric charge images 41a, 41x, 41b, 41y,41c, 41z, 41d are read from the full frame CCD 6; A/D converted into 12-bit digital data by the A/D converter 81 (Step S13) and pieces of the spectral image information corresponding to the respective spectral sensitivities are stored in the RAM 832 of the operational controller 83 via the I/O 82.

Similar to the first embodiment, a distribution of luminous intensity is obtained based on the spectral image information corresponding to each spectral sensitivity and a color distribution of luminous intensity is measured (STEP S14).

As described above, the distribution of luminous intensity is measured for each of the spectral sensitivities of the filters Fx, Fy, Fz according to the third embodiment. Thus, a distribution of luminous intensity including a color information which is actually observed by a human being, i.e. a color distribution of luminous intensity can be measured.

Also, three kinds of luminous intensity distribution electric charge images 41x, 41y,41z are formed by the use of electronic shutter. Accordingly, electric charge images can be obtained more stably than the use of mechanism shutter, thus improving the measurement accuracy.

After three kinds of luminous intensity distribution electric charge images 41x, 41y,41z are formed on the sensing surface 61, all pieces of the electric charge information are read from the full frame CCD 6 at once and A/D converted. However, the electric charge information may be read every time the luminous intensity distribution electric charge image 41x, 41y or 41z is formed and may be A/D converted. However, in view of a time interval between the formation of one luminous intensity distribution electric charge image and that of the next one, it is desirable to shorten this time interval as much as possible in order to improve the measurement accuracy of the color distribution of luminous intensity. In this respect, the third embodiment in which three luminous intensity distribution electric charge images 41x, 41y, 41z are read at once after being continuously formed is advantageous.

The pixels on the sensing surface 61 corresponding to the luminous intensity distribution electric charge images 41x, 41y, 41z are already known. Accordingly, a time required for the A/D conversion can be considerably shortened if only the electric charge information stored in the pixels is A/D converted.

In the third embodiment, a monochromatic full frame CCD 6 may be adopted as the image pickup device 6 since the luminous intensity distribution image 4(41) is sensed with different spectral sensitivities by selectively positioning the filters Fx, Fy, Fz on the optical axis by the filter switching device 110. However, instead of providing the filter switching device 110, the image pickup device 6 may be constructed by, e.g. a color CCD of three plate type.

D. Modifications of the First to Third Embodiments

The present invention is described with reference to the first to third embodiments above, but it is not limited to these embodiments. For example, since the ellipsoidal reflection surface 23 extends over a range of 180° about the axis of rotational symmetry 21 in any of these embodiments, the luminous intensity distribution measurement range is ±90° with respect to the normal line 12 of the measurement area 11. The extension angle of the ellipsoidal reflection surface 23 is not limited to 180°, but may be set at any desired angle. For example, the measurement range can be extended to 360° by arranging the ellipsoidal reflection surface 23 by 360° about the axis of rotational symmetry 21 to be described in detail later. With such an arrangement, the distribution of luminous intensity of a spot light source such as a halogen lamp can be measured.

Further, in the case of measuring the distribution of luminous intensity of a surface light source such as liquid crystal display and a CRT in which the measurement area 11 extends in a two-dimensional manner, the distribution of luminous intensity of the entire surface light source can be measured if the luminous intensity distribution measuring apparatus according to the foregoing embodiments is so constructed as to be movable in parallel along the surface light source.

In the case of measuring a surface light source having a relatively wide front surface size, in the luminous intensity distribution measuring apparatuses according to the first to third embodiments, a part of the surface light source may interfere the relay lens system 5, the image pickup device 6, or the aperture plate 7 or 100, or may block a light propagating within the apparatus, with the result that no measurement is possible. However, in such a case, the interference with the surface light source or the light blocking by the surface light source can be prevented by inserting a reflecting optical system in a suitable position.

The apparatus of the third embodiment may be modified in such manner that the liner distribution of luminous intensity is successively measured about the normal line of the measurement area 11 similar to the second embodiment, thereby to measure two-dimensional color distribution of luminous intensity.

E. Fourth Embodiment

Figure 12:
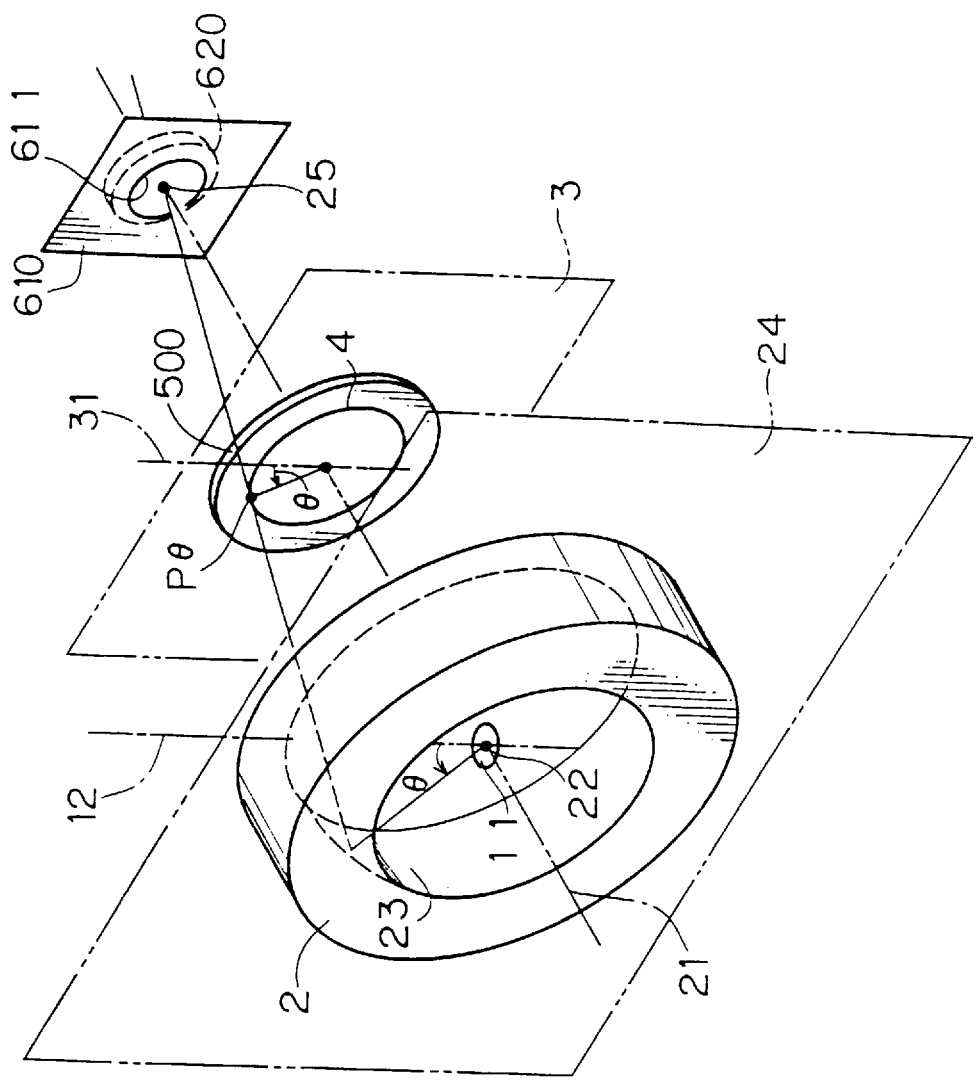
FIG. 12 is a perspective view showing the optical and electrical construction of the fourth embodiment.

FIGS. 11 and 12 are diagrams of a fourth embodiment of the luminous intensity distribution measuring apparatus according to the present invention, wherein FIG. 11 shows the optical and electrical constructions and FIG. 12 shows a part of the optical construction. This apparatus is adapted to measure a spectral distribution of luminous intensity of a spot light source (measurement area) 11 such as a halogen lamp.

Figure 13:
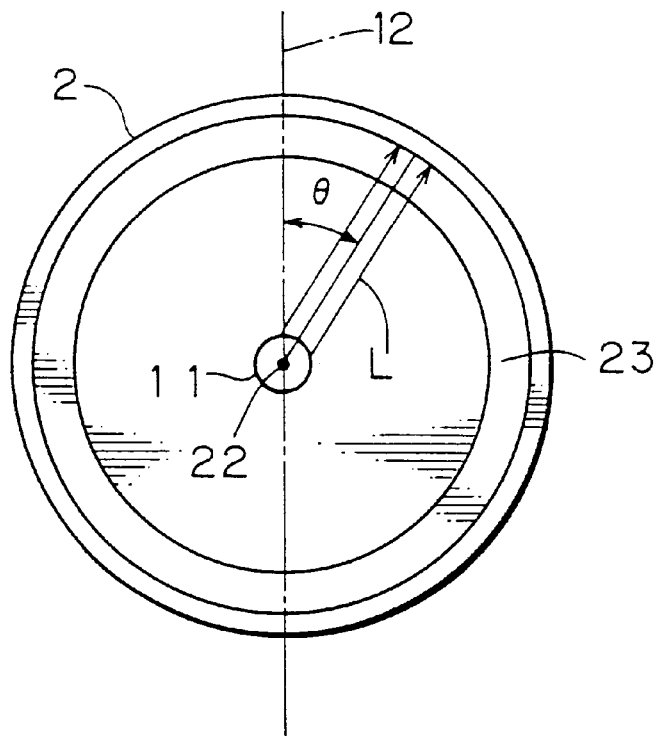
FIG. 13 is a front view of an ellipsoidal mirror of the fourth embodiment viewed from an optical focal plane side.

This apparatus is provided with a ring-shaped ellipsoidal mirror 2 as shown in FIG. 12. This ellipsoidal mirror 2 has an axis of rotational symmetry 21 and is arranged such that a first focal point 22 thereof is located in vicinity of the measurement area 11. An ellipsoidal reflection surface 23 of the ellipsoidal mirror 2 has a specified width in a parallel direction with the axis of rotational symmetry 21, and intersects a virtual plane on which the first focal point 22 is located and orthogonal to the axis 21. Thus, a light irradiating from the measurement area 11 is reflected from the ellipsoidal reflection surface 23 and focused at a second focal point 25. Further, the ellipsoidal reflection surface 23 extends over a range of 360° about the axis 21. Thus, parallel light beams L (FIG. 13) irradiating in a direction at an angle θ to a normal line 12 of the measurement area 11 are reflected from the ellipsoidal reflection surface 23 of the ellipsoidal mirror 2, and are focused at a point Pθ which is at the angle θ to a normal line 31 extending in parallel with the normal line 12 on an optical focal plane 3 as shown in FIG. 12. Accordingly, the parallel light beams L from the measurement area 11 within a range of ±180° with respect to the normal line 12 are focused in corresponding positions on the optical focal plane 3 by the ellipsoidal mirror 2, with the result that a luminous intensity distribution image 4 of the circular measurement area 11 is formed on the optical focal plane 3.

Figures 14A, 14B:
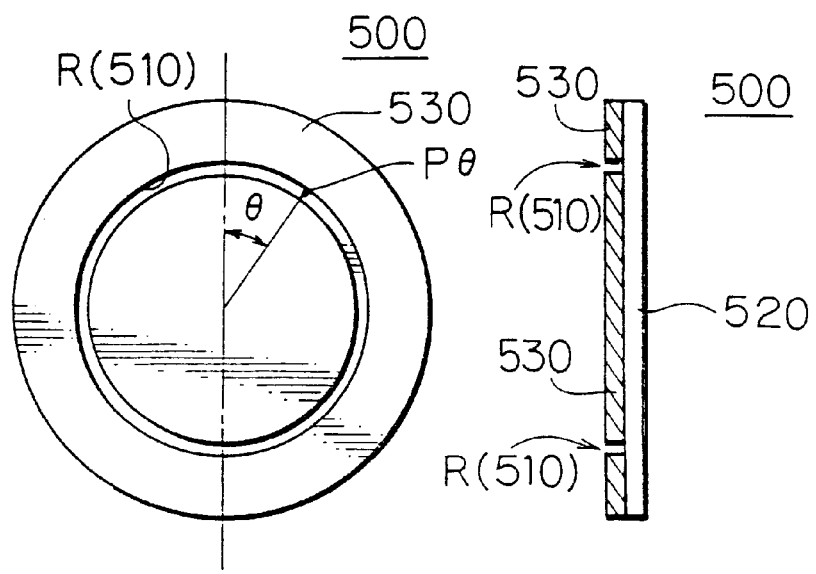
FIG. 14A is a front view of an aperture plate.
FIG. 14B is a cross-sectional view of the aperture plate.

On the optical focal plane 3 is located an aperture plate 500 having an aperture 510 extending along the luminous intensity distribution image 4 of the measurement area 11 formed on the optical focal plane 3 by the ellipsoidal mirror 2. The aperture plate 500 is, for example, constructed such that a masking layer 530 is formed on the entire surface of a transparent glass plate 520, leaving a circular region R corresponding to the luminous intensity distribution image 4 as shown in FIGS. 14A and 14B. The circular region R corresponds to the aperture 510.

The light beams coming from the aperture 510 formed in the aperture plate 500 are incident on a dispersed image forming optical system 600. The optical system 600 is comprised of an aperture plate 610, a first relay lens 620, a transmission type diffraction grating 630, a restricting plate 640, a condenser lens 650 and a second relay lens 660 arranged in this order from the aperture plate 500 side, and forms a dispersed image of the luminous intensity distribution image 4 in a specified image-forming position 670.

In this luminous intensity distribution measuring apparatus, the first relay lens 620 is provided in vicinity of the second focal point 25 to direct the luminous intensity distribution image 4 formed on the optical focal plane 3 onto an intermediate image-forming position 671. Accordingly, the luminous intensity distribution image 4 of a suitable size can be formed in the intermediate image-forming position 671 by adjusting the magnification of the first relay lens 620. In this embodiment, the luminous intensity distribution image 4 on the optical focal plane 3 is formed on the intermediate image-forming position 671 in a reduced size by the first relay lens 620 as is clear from FIG. 11.

An aperture plate 610, having an aperture 611 corresponding to the measurement area 11, is provided in vicinity of a front side of the first relay lens 620. The measurement area 11 is determined by providing this aperture plate 610. In other words, the aperture plate 610 functions as a field stop. The position of the aperture plate 610 is not limited to a position in vicinity of the front side of the first relay lens 620, but may be a position in vicinity of a rear side of the first relay lens 620. It is not necessary to provide the aperture plate 610 if the measurement area 11 is substantially determined by an outer frame (not shown) of the first relay lens 620 or the like.

Figure 15:
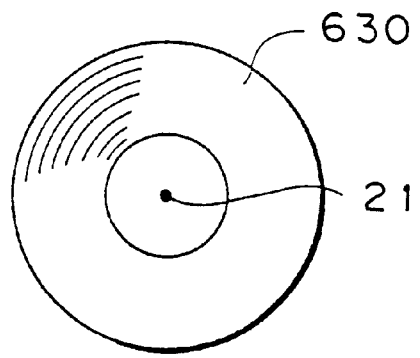
FIG. 15 is a front view of a transmission type diffraction grating which functions as a wavelength diffusion unit.
Figure 16:
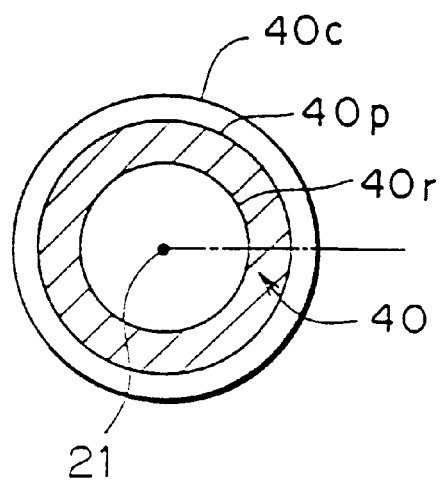
FIG. 16 is a diagram of an image formed in an intermediate image-formation position.
Figure 17:
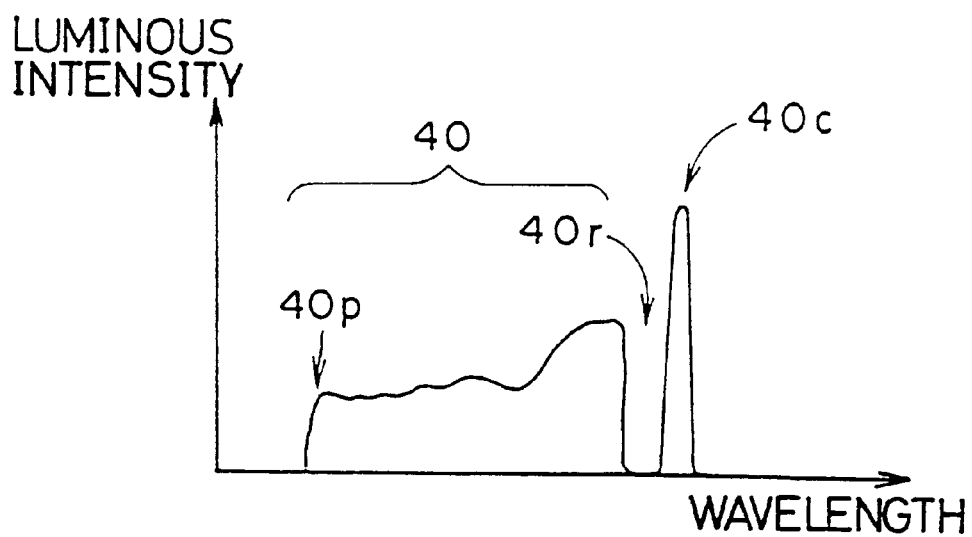
FIG. 17 is a graph showing a distribution of luminous intensity of the image (FIG. 16) formed in the intermediate image-formation position.

Between the first relay lens 620 and the intermediate image-forming position 671 is provided the transmission type diffraction grating 630 as a wavelength dispersion unit for dispersing the light beams coming out of the aperture 510 of the aperture plate 500. In this embodiment, the diffraction grating 630 has a cyclical concentric diffraction pattern and is symmetrical with respect to the optical axis (which coincides with the axis of rotational symmetry 21 in this embodiment) of the dispersed image forming optical system 600 as shown in FIG. 15. Thus, the light beams passing through the first relay lens 620 are radially dispersed, and an intermediate dispersed image 40 of the luminous intensity distribution image 4 as shown in FIG. 16 is formed in the intermediate image-forming position 671. The intermediate dispersed image 40 is comprised of a series of circular luminous intensity distribution images 40p to 40r having different diameters corresponding to their wavelengths. A distribution of luminous intensity taken along a radial direction showing by a phantom line of FIG. 16 changes, for example, as shown in FIG. 17. Identified by 40c in FIGS. 16 and 17 is a zero-order image formed by zero-order light beams coming from the diffraction grating 630. The restricting plate 640 is provided in the intermediate image-forming position 671 in order to eliminate the zero-order image 40c from the dispersed image 40 in this embodiment. Specifically, an aperture 641 of a size corresponding to the intermediate dispersed image 40 is formed substantially in the middle of the restricting plate 640, so that the light beams forming the zero-order image 40c are blocked by the restricting plate 640, and the light beams forming the intermediate dispersed image 40 pass through the aperture 641 and are incident on the second relay lens 660 while being converged via the condenser lens 650 arranged in the intermediate image-forming position 671. Although the restricting plate 640 is arranged in the intermediate image-forming position 671 in this embodiment, the position thereof is not limited to this, but may be between the diffraction grating 630 and the intermediate image-forming position 671.

Figure 18:
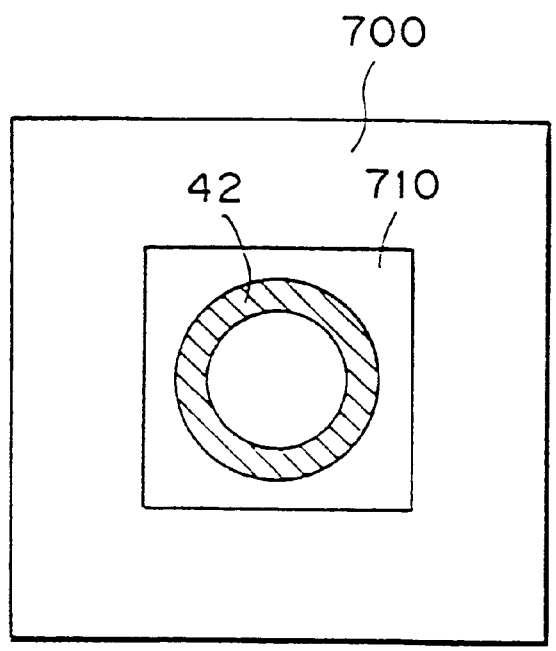
FIG. 18 is a diagram of a dispersed image formed on a sensing surface.

The second relay lens 660 reduces the intermediate dispersed image 40 and forms a dispersed image 42 on a sensing surface 710 of an imagepickupdevice 700 as shown in FIG. 18. In this embodiment, the image pickup device 700 is arranged such that the sensing surface 710 coincides with a image-forming position 670.

Next, the electrical construction of the luminous intensity distribution measuring apparatus will be described with reference to FIG. 11. In this apparatus, an A/D converter 81 is connected with the image pickup device 700. After being A/D converted, an image information corresponding to the dispersed image 42 sensed by the image pickup device 700 is sent to an operational controller 83 via an I/O 82. The operational controller 83 is comprised of a CPU 831 for calculating a spectral distribution of luminous intensity of the measurement area 11 based on the image information corresponding to the dispersed image 42, a RAM 832 for temporarily storing the image information and a ROM 833 for storing programs to be described later in advance. The spectral distribution of luminous intensity of the measurement area 11 is calculated based on the dispersed image 42 in a manner as described next.

Figures 19A, 19B:
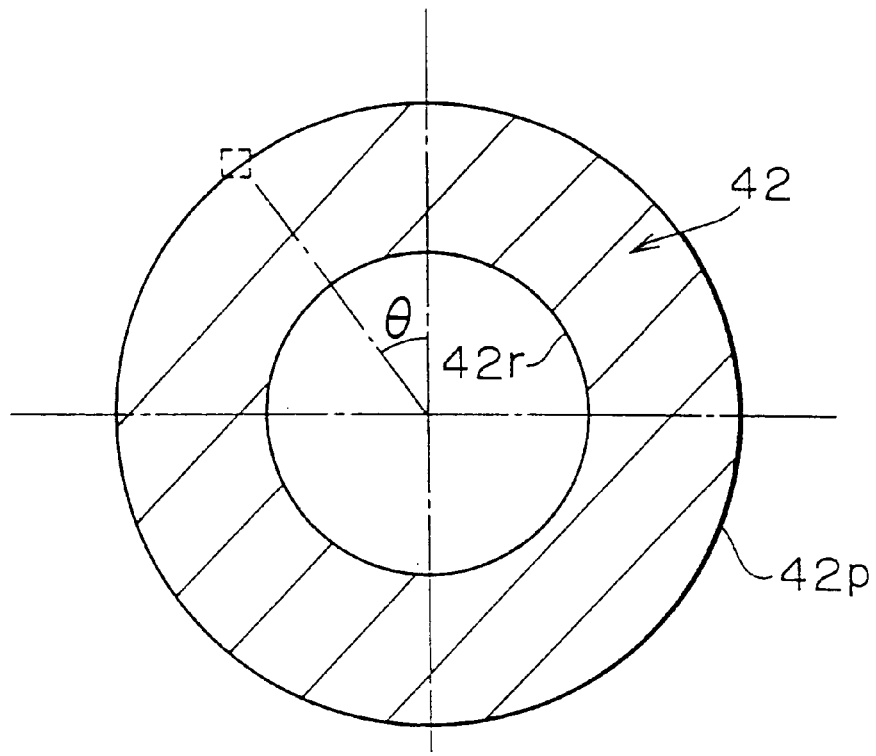
FIGS. 19A and 19B are schematic diagrams showing a correspondence between a memory space corresponding to a pixel constituting a sensing surface and an intensity distribution image projected on the sensing surface.

FIGS. 19A and 19B diagrams showing a correspondence between a memory space corresponding to pixels constructing the sensing surface 710 and a luminous intensity distribution image (here, the luminous intensity distribution image 42p) which forms a dispersed image 42 refocused on the sensing surface 710. This memory space is defined by arranging a plurality of pieces of image information in a matrix manner. In the operational controller 83, a 3×3 image data (FIG. 19B) corresponding to a part of the luminous intensity distribution image 42p, e.g. to a portion of the luminous intensity distribution image at the angle θ to the normal line extending in parallel with the normal line 12 of the measurement area 11 is read from the RAM 832, and an integral value of nine image data D(m−1, n−1), . . . , D(m+1, n+1) is obtained as a luminous intensity to the angle θ at a specific wavelength p. The above processing is applied to all portions within the range of ±180° to the normal line at a specified wavelength range (from p to r) to calculate a linear distribution of luminous intensity of the measurement area 11. The form of the image data which corresponds to the luminous intensity distribution image and is to be read is not limited to a 3×3 matrix, but is any arbitrary form. Although the integral value is obtained as the luminous intensity to the angle θ here, any other specific value (e.g. an average value) may be obtained as such.

As described above, according to the fourth embodiment, the dispersed image 42 of the measurement area 11 is sensed and the spectral distribution of luminous intensity of the measurement area 11 is calculated based on this dispersed image 42. Thus, the spectral distribution of luminous intensity can be obtained by a simple construction and within a short time. Particularly in this embodiment, the dispersed image 42 is sensed at once within the range of ±180° with respect to the normal line 12. Accordingly, the distribution of luminous intensity can be measured with high accuracy without being influenced by a change of the light source over time. Further, the luminous intensity distribution image 4 is formed by reflecting the beams L irradiating from the measurement area 11 by the ellipsoidal reflection surface 23 having a symmetrical shape with respect to the axis of rotational symmetry 21, and then the dispersed image 42 is formed. Thus, an incidence angle on the ellipsoidal reflection surface 23 is same at any angle to the normal line 12. Even in the case that the measurement area 11 is a polarized light source, the light beams advancing in the apparatus have the same relationship between the axis and plane of polarization. Therefore, the spectral distribution of luminous intensity can be measured with high accuracy without causing a problem residing in the prior art that the measurement result depends on the angle θ.

Figure 20:
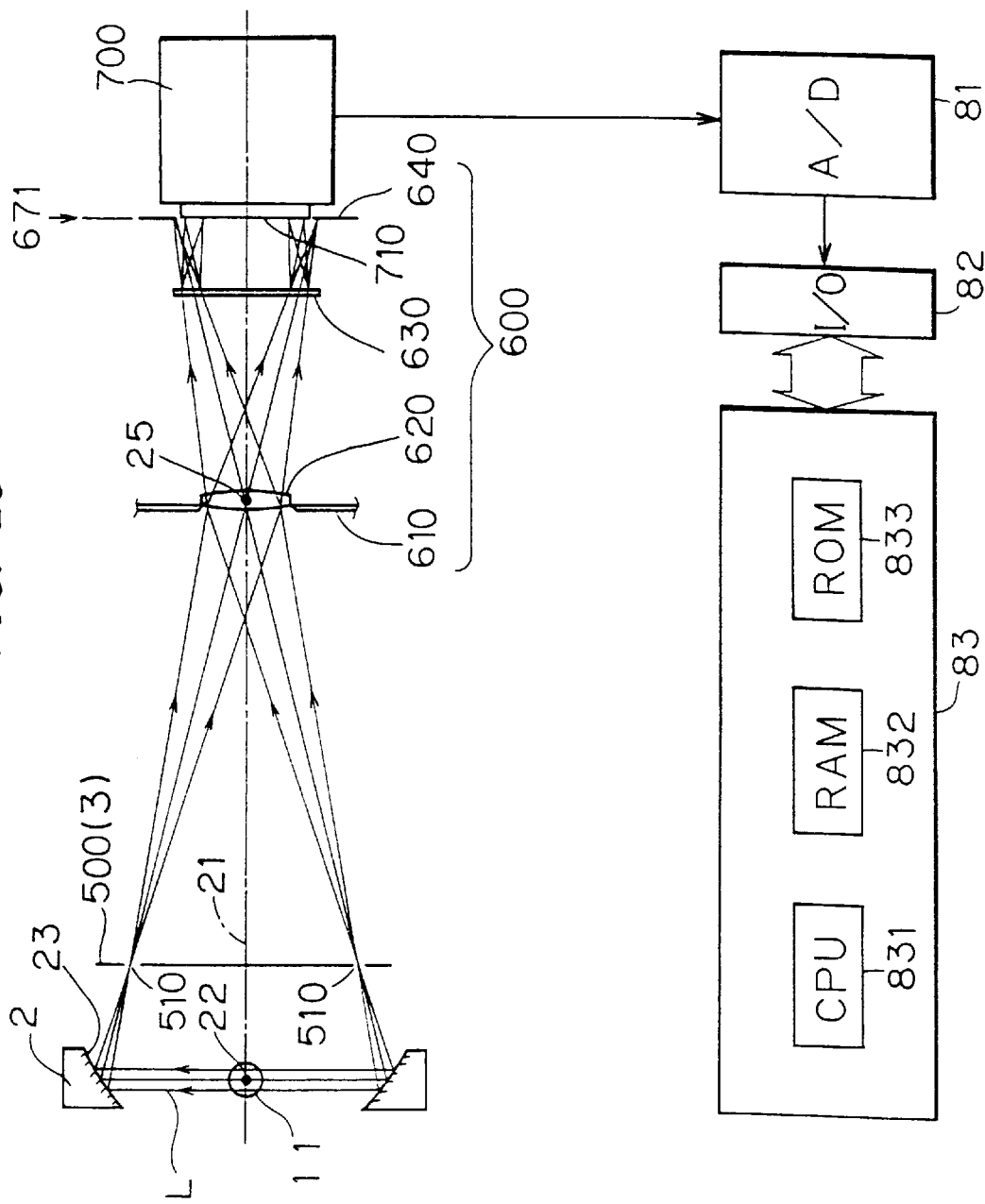
FIG. 20 is a diagram of a modification of the luminous intensity distribution measuring apparatus according to the fourth embodiment.

In the fourth embodiment, the dispersed image 42 of the luminous intensity distribution image 4 formed on the optical focal plane 3 is formed in the intermediate image-forming position 671, and is formed in the image-forming position 670 by being formed on the sensing surface 710 by the second relay lens 660. However, as shown in FIG. 20, the spectral distribution of luminous intensity of the measurement area 11 may be obtained in a manner similar to the above by sensing the intermediate dispersed image 40 with the sensing surface 710 of the image pickup device 700 coincided with the intermediate image-forming position 671.

The transmission type diffraction grating 630 is used in this embodiment in order to form the dispersed image 40 by dispersing the light beams coming out of the aperture 510 of the aperture plate 500. Instead of this, a conic prism may be used as the wavelength dispersion unit. Further, a reflection type diffraction grating may also be used as the wavelength dispersion unit as shown in FIG. 21.

F. Fifth Embodiment

Figure 21:
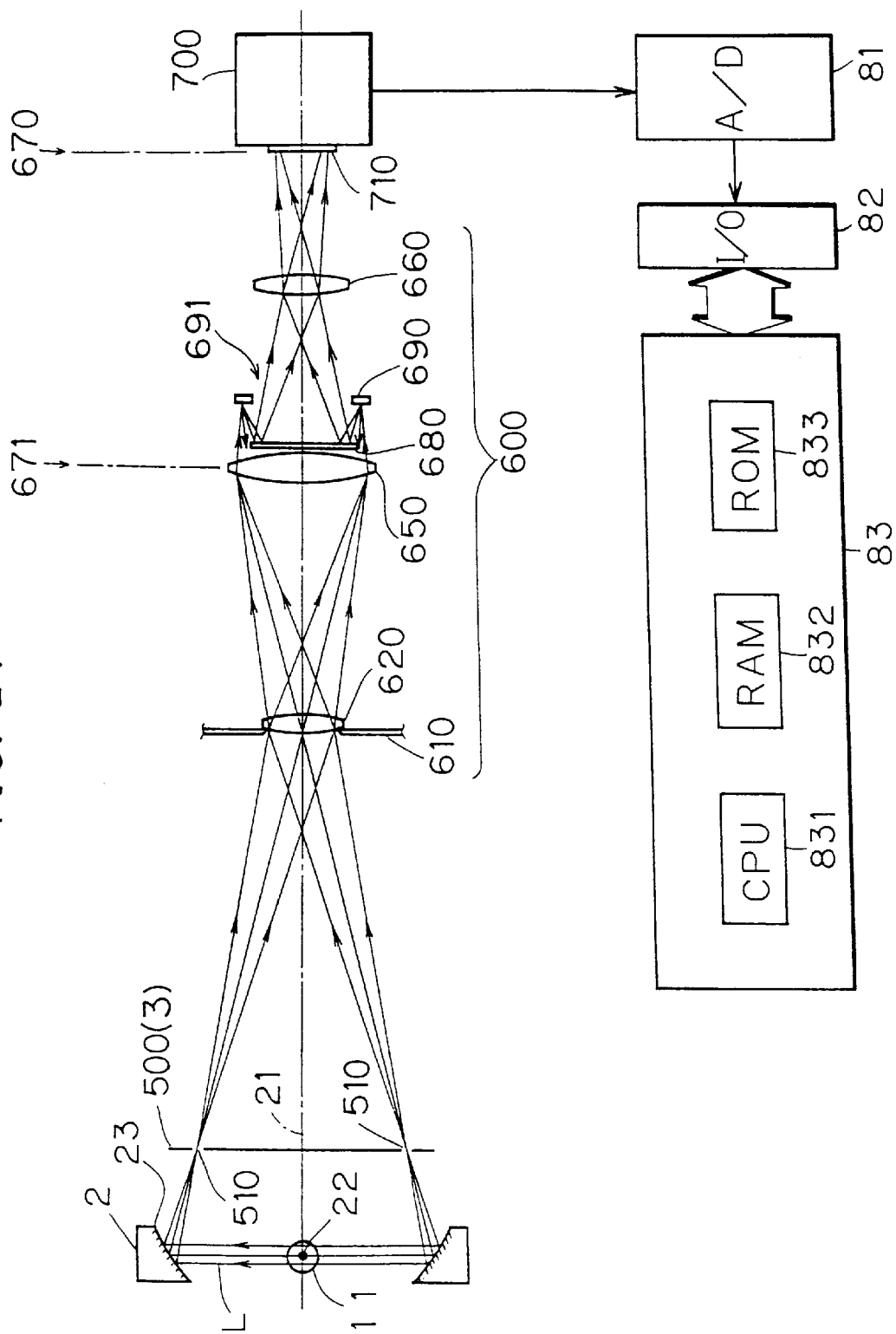
FIG. 21 is a diagram showing the optical and electrical constructions of a fifth embodiment of the luminous intensity distribution measuring apparatus according to the present invention.

FIG. 21 is a diagram of a fifth embodiment of the luminous intensity distribution measuring apparatus according to the present invention. This apparatus largely differs from the apparatus of the fourth embodiment only in the specific construction of the dispersed image forming optical system 600. Since the other construction is same as the fourth embodiment, only the different construction, i.e. the construction of the dispersed image forming optical system 600 will be described in detail without giving no description to the same construction while identifying it by the same reference numerals.

In the fifth embodiment, the dispersed image forming optical system 600 is comprised of an aperture plate 610, a first relay lens 620, a condenser lens 650, a restricting plate 680, a reflection type diffraction grating 690 and a second relay lens 660 which are arranged in this order from an aperture plate 500 side as shown in FIG. 21, and is adapted to form a dispersed image of a luminous intensity distribution image 4 in a specified image-forming position 670. Similar to the fourth embodiment, in this apparatus, light beams irradiating from a measurement area 11 are reflected from an ellipsoidal mirror 2 and gathered at a second focal point 25, thereby forming a luminous intensity distribution image 4 of the measurement area 11 on an optical focal plane 3. Further, the light beams coming through an annular aperture 510 formed in the aperture plate 500 along the luminous intensity distribution image 4, are incident on the dispersed image forming optical system 600. In the optical system 600, the first relay lens 620 is provided in vicinity of the second focal point 25 to form a reduced image of the luminous intensity distribution image 4 on the optical focal plane 3 in an intermediate image-forming position 671. In the fifth embodiment as well, an aperture plate 610 formed with an aperture 611 corresponding to the measurement area 11 is provided in vicinity of the front side of the first relay lens 620. The measurement area 11 is determined by providing the aperture plate 610.

In the dispersed image forming optical system 600, the condenser lens 650 is arranged in the intermediate image-forming position 671. The light beams from the condenser lens 650 pass the outside the outer edge of the circular restricting plate 680 while being converged, and are then incident on the annular reflection type diffraction grating 690. In this embodiment, the reflection type diffraction grating 690 has a cyclical concentric diffraction pattern, and is so finished as to be symmetrical with respect to the optical axis of the optical system 600 (the axis of rotational symmetry 21 in this embodiment), and a hollow region 691 is formed on and near the optical axis. Accordingly, the light beams having been incident on the diffraction grating 690 are reflected toward the restricting plate 680 while being dispersed according to wavelengths.

All reflected light beams except zero-order light beam are reflected again from the restricting plate 680 and pass the hollow region 691 of the diffraction grating 690. These light beams are further introduced to the image-forming position 670 via the second relay lens 660 to form a dispersed image of the luminous intensity distribution image 4 again. In the image-forming position 670 is arranged a sensing surface 710 of an image pickup device 700. Similar to the fourth embodiment, a dispersed image is sensed by the image pickup device 700 and a spectral distribution of luminous intensity of the measurement area 11 is calculated from the dispersed image based on a signal outputted from the image pickup device 700.

As described above, the dispersed image can be formed by dispersing the light beams coming through the aperture 510 of the aperture plate 500 by the reflection type diffraction grating 690 adopted as the wavelength dispersion unit. In this case as well, the same effects as the fourth embodiment can be obtained.

In the fifth embodiment, the linear distribution of luminous intensity is measured. However, a two-dimensional distribution of luminous intensity of the measurement area 11 can be measured by successively measuring the linear distribution of luminous intensity in each rotational position as described above while integrally rotating the ellipsoidal mirror 2, the aperture plate 500, the dispersed image forming optical system 600 and the image pickup device 700 about the normal line 12 of the measurement area 11 with respect to the measurement area 11.

Further, the apparatus of the above embodiment may be modified in such manner that the luminous intensity distribution image is sensed by the image pickup device 700 without providing the dispersed image forming optical system 600. Accordingly, the distribution of luminous intensity of the measurement area 11 can be measured by the modified apparatus.

Figure 22:
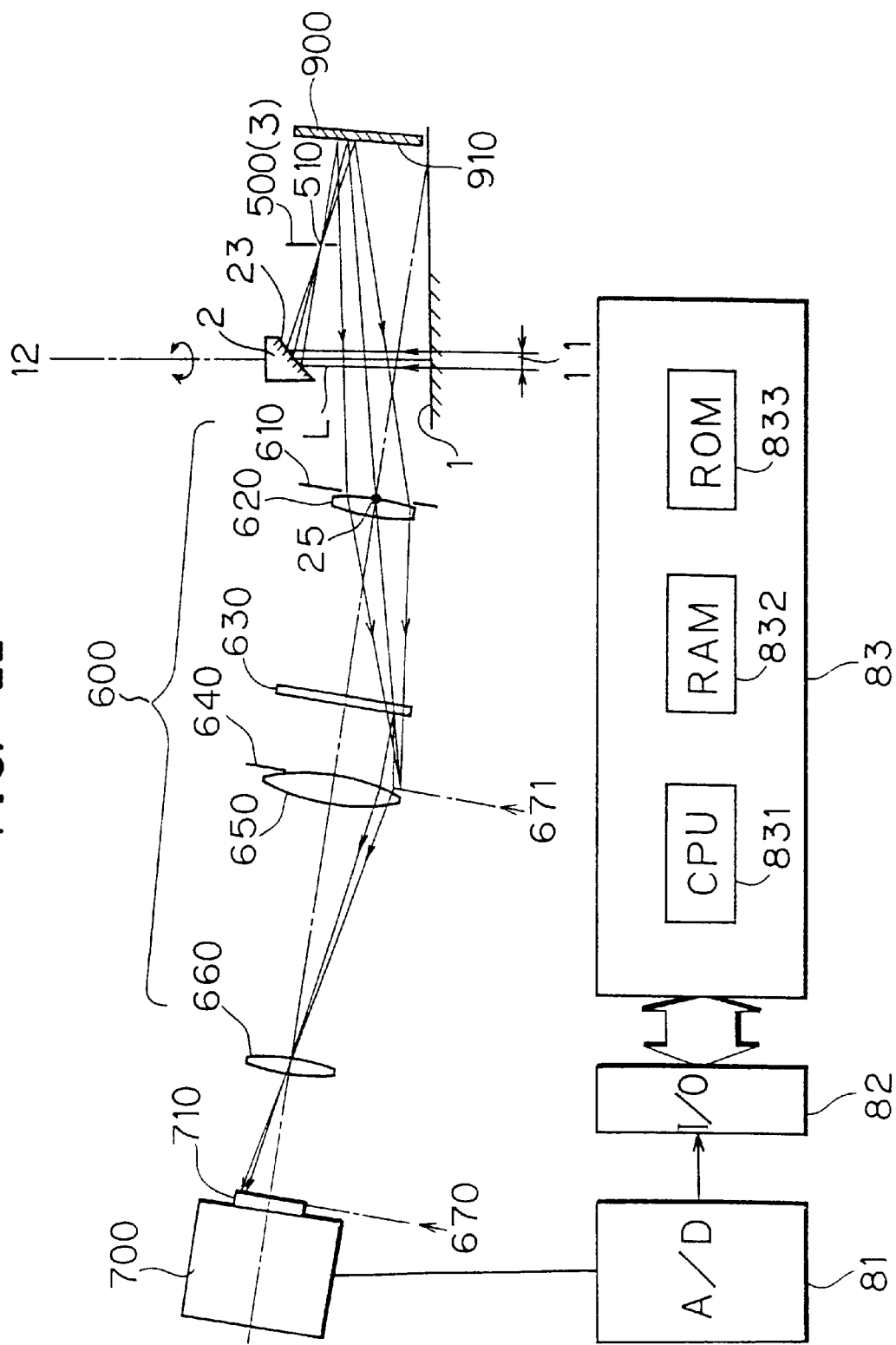
FIG. 22 is a diagram showing the optical and electrical constructions of a sixth embodiment of the luminous intensity distribution measuring apparatus according to the present invention.

Further, in the fifth embodiment, the ellipsoidal reflection surface 23 extends by 360° about the axis of rotational symmetry 21. However, the extension angle of the ellipsoidal reflection surface 23 about the axis 21 is not limited to 360°, but maybe any arbitrary value. For example, the ellipsoidal reflection surface 23 may extend by about 180° about the axis 21 as shown in FIG. 22. With the luminous intensity distribution measuring apparatus having this ellipsoidal reflection surface 23, a distribution of luminous intensity of a surface light source such as a CRT or a liquid crystal display can be satisfactorily measured. Hereafter, the construction of the luminous intensity distribution measuring apparatus suited to the luminous intensity distribution measurement of a surface light source will be described with reference to FIGS. 22 and 23.

G. Sixth Embodiment

Figure 23:
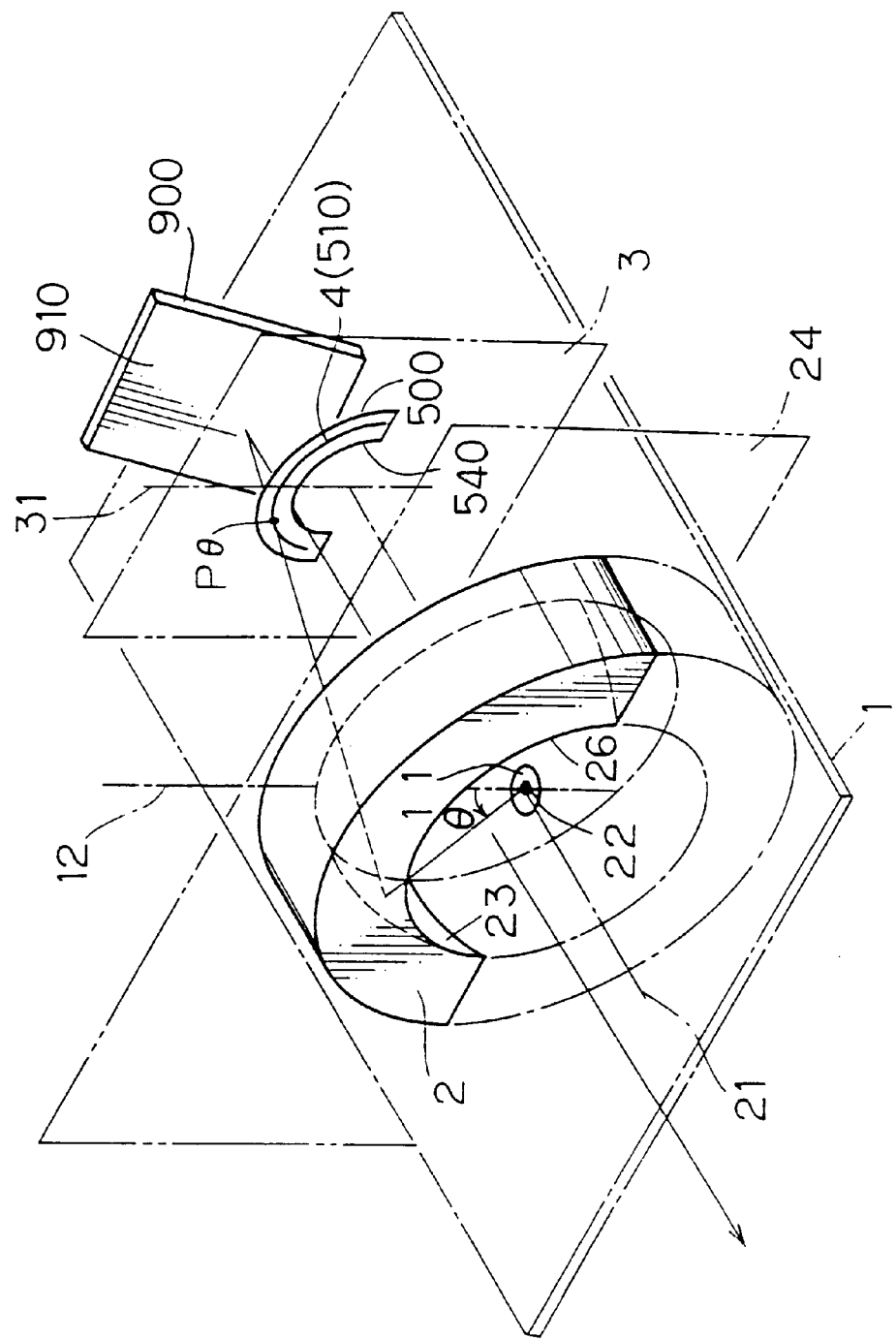
FIG. 23 is a diagram showing a part of the optical construction of the sixth embodiment.

FIGS. 22 and 23 are diagrams showing a sixth embodiment of the luminous intensity distribution measuring apparatus according to the present invention, wherein FIG. 22 shows optical and electrical constructions and FIG. 23 shows a part of the optical construction. This luminous intensity distribution measuring apparatus is adapted to measure the distribution of luminous intensity of a fine area (measurement area) 11 of a surface light source (sample light source) 1 such as a CRT or a liquid crystal display.

This luminous intensity distribution measuring apparatus is provided with a half-ring shaped ellipsoidal mirror 2 arranged above the measurement sample 1. The ellipsoidal mirror 2 has an axis of rotational symmetry 21 and is arranged such that a first focal point 22 thereof is located in vicinity of the measurement area 11. An ellipsoidal reflection surface 23 of the ellipsoidal mirror 2 has a specified width in a parallel direction with the axis of rotational symmetry 21, and intersects a virtual plane on which the first focal point 22 is located and orthogonal to the axis 21, and is so constructed as to gather light beams irradiating from the measurement area 11 toward a second focal point 25 (see FIG. 22). In this embodiment, the ellipsoidal reflection surface 23 extends by 180° about the axis 21. Thus, parallel light beams L irradiating from the measurement area 11 in a direction of an angle θ to a normal line 12 of the measurement area 11 are reflected from the ellipsoidal reflection surface 23 of the ellipsoidal mirror 2, and focused at a point Pθ which is at an angle θ to a normal line 31 extending in parallel with the normal line 12 on an optical focal plane 3 as shown in FIG. 23. Accordingly, the parallel light beams L irradiating from the measurement area 11 are focused in a corresponding position on the optical focal plane 3 in a range of ±90° with respect to the normal line 12 by the ellipsoidal mirror 2. As a result, a semicircular luminous intensity distribution image 4 of the measurement area 11 is formed on the optical focal plane 3.

On the optical focal plane 3 is provided an aperture plate 500 having an aperture 510 extending along the luminous intensity distribution image 4 of the measurement area 11. This aperture plate 500 differs from that of the fourth embodiment in that it is a half-ring shaped plate and that the light beams coming out of the aperture 510 are introduced toward the ellipsoidal mirror 2 side by being reflected from a reflection mirror 900 and passing through a central opening 540 of the aperture plate 500. The other construction is same.

Behind the aperture plate 500 (at the right side in FIG. 22) is arranged the reflection mirror 900 such that a line normal to a reflection surface 910 thereof is inclined upward with respect to the axis of rotational symmetry 21. The light beams reflected from the reflection mirror 900 are incident on a dispersed image forming optical system 600 via the central opening 540 of the aperture plate 500 and a central opening 26 of the ellipsoidal mirror 2.

Further, in this luminous intensity distribution measuring apparatus, the dispersed image forming optical system 600 and an image pickup device 700 are same as those of the fourth embodiment except that they are provided above the sample light source 1 as shown in FIG. 22. A dispersed image of the luminous intensity distribution image 4 is formed on a sensing surface 710 of the image pickup device 700 by the dispersed image forming optical system 600, and the dispersed image is sensed by the image pickup device 700. In other words, the light beams incident on the dispersed image forming optical system 600 as above are incident on a transmission type diffraction grating 630 via an aperture 611 of an aperture plate 610 and a first relay lens 620. By the diffraction grating 630 the light beams are dispersed in radial directions, with the result that an intermediate dispersed image of the luminous intensity distribution image 4 is formed in an intermediate image-forming position 671. Further, the light beams passing through a restricting plate 640 for removing a zero-order image are incident on a second relay lens 660 while being converged via a condenser lens 650. Thus, a reduced image of intermediate dispersed image is formed on the sensing surface 710 of the image pickup device 700, and the dispersed image is sensed by the image pickup device 700.

The electrical construction of this luminous intensity distribution measuring apparatus is also same as the fourth embodiment, and the spectral distribution of luminous intensity of the measurement area 11 is calculated from the dispersed image in accordance with a signal outputted from the image pickup device 700.

As described above, according to the sixth embodiment, the dispersed image of the measurement area 11 is sensed, and the spectral distribution of luminous intensity of the measurement area 11 is obtained based on the dispersed image. Accordingly, similar to the fourth embodiment, the spectral distribution of luminous intensity can be obtained by a simple construction and within a short time. Particularly, even if the measurement sample 1 is a polarized light source such as a liquid crystal display, the light beams L irradiating from the measurement area 11 are reflected by the ellipsoidal reflection surface 23 having a shape symmetrical with respect to the axis of rotational symmetry 21 to form the luminous intensity distribution image 4, and the dispersed image 42 is formed by the transmission type diffraction grating 630 having a symmetrical construction with respect to the axis 21. Accordingly, the incident angle of the light beams L on the ellipsoidal reflection surface 23 is same at any angle to the normal line 12. Even if the measurement area 11 is a polarized light source, the light beams advancing in the apparatus have the same relationship between the axis and plane of polarization, and thus this embodiment is free from the problem of the prior art: the measurement result depends on the angle θ. Further, since the light beams L are incident on the reflection mirror 900 substantially at right angles, this reflection characteristic does not depend on the axis of polarization, either.

In this embodiment, the ellipsoidal mirror 2, the aperture plate 500, the reflection mirror 900, the dispersed image forming optical system 600 and the image pickup device 700 are arranged above the sample light source 1, and the light beams from the ellipsoidal reflection mirror 23 are introduced to the image pickup device 700 by the reflection mirror 900 so that the image pickup device 700 can sense the dispersed image. Accordingly, the reflected light beams do not cross the sample light source 1, with the result that the spectral distribution of luminous intensity of the measurement area 11 can be measured without the restriction of the planar size of the light source 1.

Further, the two-dimensional distribution of luminous intensity of the measurement area 11 can be measured by successively measuring the linear distribution of luminous intensity in each rotational position while rotating the ellipsoidal mirror 2, the aperture plate 500, the reflection mirror 900, the dispersed image forming optical system 600 and the image pickup device 700 integrally about the normal line 12 of the measurement area 11. In this case, by reflecting the light beams from the reflection mirror 900, a radius of the rotation of a rotary assembly (the ellipsoidal mirror 2, the aperture plate 500, the reflection mirror 900, the dispersed image forming optical system 600 and the image pickup device 700) can be made smaller. This is advantageous in downsizing the apparatus. Furthermore, in this case, since each measurement data of the linear distribution of luminous intensity in each rotational position includes a data corresponding to the normal direction of the measurement area, a change of the light source during the rotation and a variation in reflectivity due to a change in relative relationship between the axis of polarization of the light source and the surface of the ellipsoidal mirror can be corrected by normalizing the linear distribution of luminous intensity data in each rotational position by the measurement value in the normal direction.

Although the reflection mirror 900 is so arranged as to reflect the light beams from the opening 510 in the sixth embodiment, it can be arranged in a desired position and a desired number thereof can be arranged.

Although the spectral distribution of luminous intensity of the measurement area 11 is measured with the light source irradiating the light beams as the sample light source in the fourth to sixth embodiments, a deviation spectral distribution of luminous intensity of an illuminated measurement area can be measured by adding an illumination unit for illuminating the measurement area as described next. Herebelow, a seventh embodiment will be described with reference to FIGS. 24 to 26.

H. Seventh Embodiment

Figure 24:
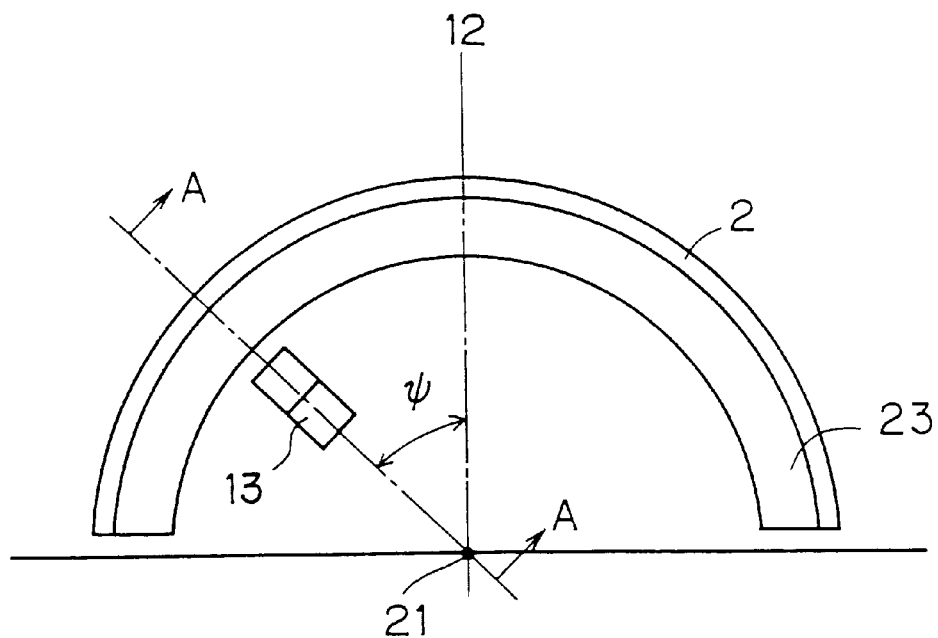
FIG. 24 is a partial front view of a seventh embodiment of the luminous intensity distribution measuring apparatus according to the present invention.
Figure 25:
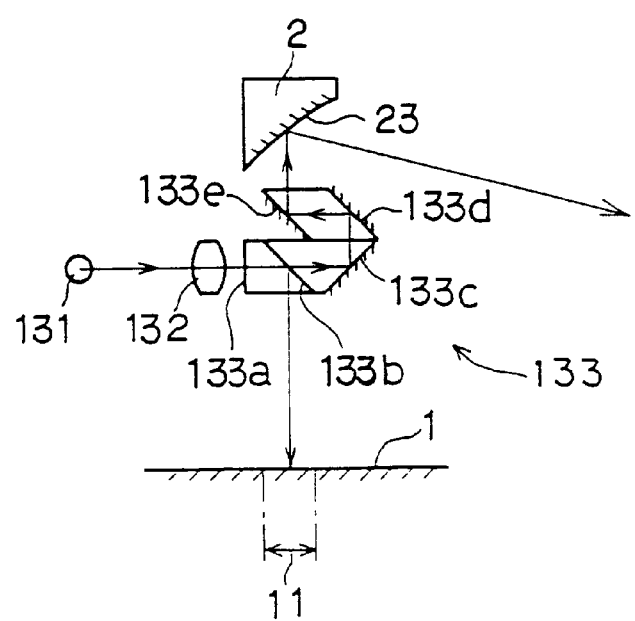
FIG. 25 is a sectional view taken along the line A—A of FIG. 24.

FIGS. 24 and 25 are diagrams showing the seventh embodiment of the luminous intensity distribution measuring apparatus according to the present invention, wherein FIG. 24 shows an ellipsoidal mirror 2 when viewed from front and FIG. 25 is a sectional view taken along A—A of FIG. 24. This apparatus is constructed by assembling an illumination unit 13 into the luminous intensity distribution measuring apparatus of the sixth embodiment, and adapted to measure a spectral distribution of luminous intensity of light beams from a measurement area 11 illuminated by the illumination unit 13.

As shown in FIG. 25, the illumination unit 13 includes a light source 131, a lens 132 and a beam splitter 133, and is constructed such that an illumination light irradiated from the light source 131 is incident on the beam splitter 133 via the lens 132. The beam splitter 133 is arranged at an angle ψ to the normal line 12 as shown in FIG. 24. When the illumination light from the light source 131 is incident on an incident surface 133a as described above, a part of the illumination light (reflection components) are reflected toward the measurement area 11 by a reflection surface 133b inclined at 45° to the illumination light, thereby to illuminate the measurement area 11. Components of the illumination light except the reflection components (components having passed the reflection surface 133b) are reflected toward a reflection surface 133e by reflection surfaces 133c, 133d, and further reflected by the reflection surface 133e to be introduced to an ellipsoidal reflection surface 23. In other words, this beam splitter 133 projects a part of the illumination light from the light source 131 to the measurement area 11 and projects at least a part of the remaining toward the ellipsoidal reflection surface 23.

Since the luminous intensity distribution measuring apparatus according to the seventh embodiment is same as the sixth embodiment except the illumination unit 13, no repetitive description is given here by identifying the same construction by same reference numerals.

Figure 26:
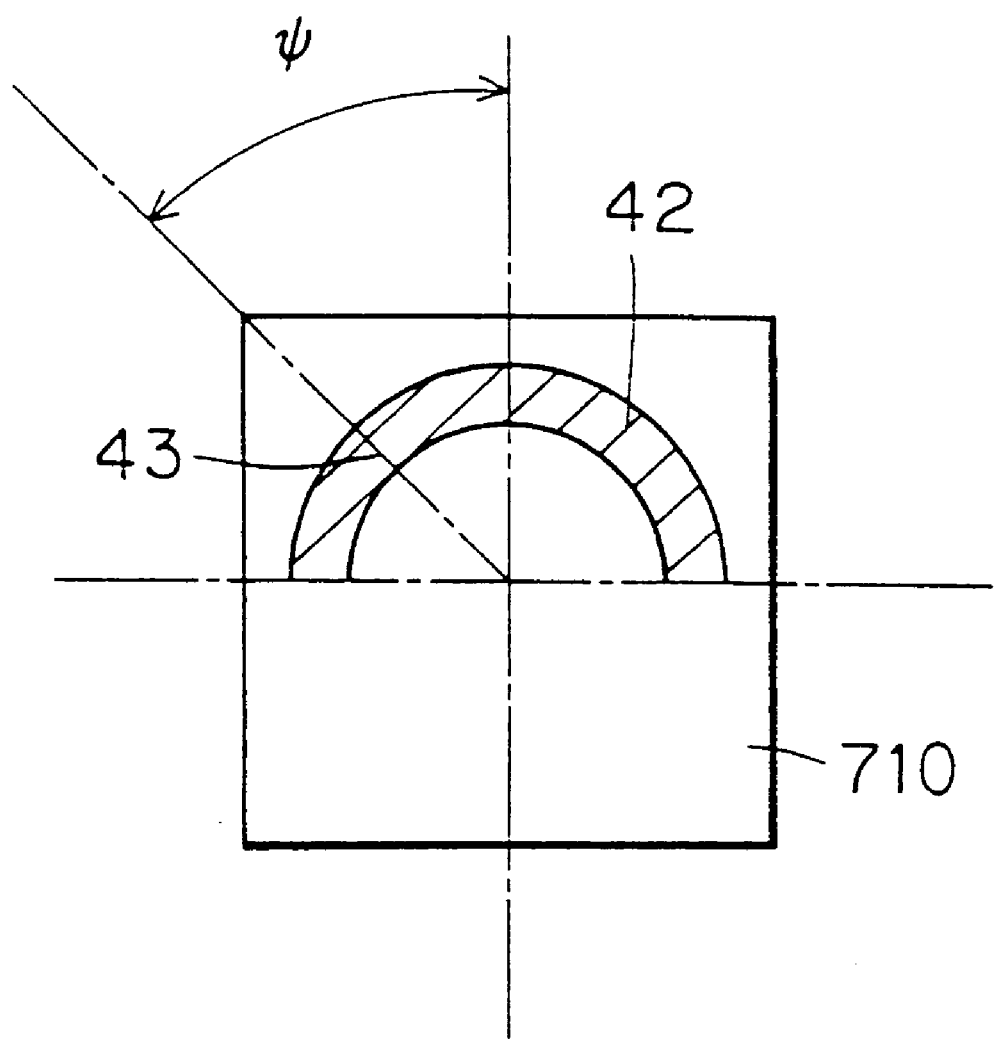
FIG. 26 is a diagram of a dispersed image formed on a sensing surface in the luminous intensity distribution measuring apparatus of FIG. 24.

In this luminous intensity distribution measuring apparatus, since the measurement area 11 is illuminated by the illumination unit 13 as described above, the light beams from the measurement area 11 are reflected from the ellipsoidal reflection surface 23 of the ellipsoidal mirror 2 as in the sixth embodiment, and the luminous intensity distribution image 4 of the measurement area 11 is formed on the optical focal plane 3. Further, the light beams coming through the aperture 510 of the aperture plate 500 arranged on the optical focal plane 3 are reflected toward the ellipsoidal mirror 2 from the reflection mirror 900 and incident on the dispersed image forming optical system 600, and a dispersed image 42 of the luminous intensity distribution image 4 is formed on the sensing surface 710 of the image pickup device 700 (FIG. 26).

At the same time the dispersed image is formed on the sensing surface 710 by the light beams reflected by the measurement area 11 as described above, a part of the illumination light directly projected to the ellipsoidal mirror 2 by the beam splitter 133 is reflected from the ellipsoidal reflection surface 23 and a light image of the light source 131 is formed on the optical focal plane 3. Further, the light beams corresponding to this light image come through the opening 510 of the aperture plate 500, and reflected toward the ellipsoidal mirror 2 side from the reflection mirror 900. Thereafter, these light beams are incident on the dispersed image forming optical system 600, and a dispersed image 43 is formed on the sensing surface 710 of the image pickup device 700 (FIG. 26).

As described above, the dispersed image 42 of the measurement area 11 and the dispersed image 43 of the light source 131 are simultaneously formed on the same sensing surface 710 according to the seventh embodiment. After being A/D converted, an image information corresponding to both dispersed images 42, 43 is inputted to the operational controller 83 via the I/O 82. In this embodiment, the spectral distribution of luminous intensity of the measurement area 11 is calculated based on the image information corresponding to the dispersed image 42 substantially in the same manner as the spectral distribution of luminous intensity is measured in the fourth embodiment. Further, after the spectral distribution of luminous intensity of the light source 131 is calculated based on the image information corresponding to the dispersed image 43, the deviation spectral distribution of luminous intensity of the light reflected by the measurement area 11 is obtained by calculating a ratio of these spectral distributions of luminous intensity for each wavelength.

Although the present invention has been fully described by way of example with reference to the accompanying drawings, it is to be understood that various changes and modifications will be apparent to those skilled in the art.

Therefore, unless otherwise such changes and modifications depart from the scope of the present invention, they should be construed as being included therein.

What is claimed is:

1. An apparatus for measuring a distribution of luminous intensity of a light source having a measurement area to be measured, comprising:

an ellipsoidal mirror having an axis of rotational symmetry, and including an ellipsoidal reflection surface having first and second focal points, the ellipsoidal mirror being disposed so that the first focal point is positioned in vicinity of the measurement area, the ellipsoidal mirror reflecting parallel light beams from the measurement area onto an optical focal plane on which the reflected light beams are focused, whereby a luminous intensity distribution image of the measurement area is formed on the optical focal plane;

an image pickup unit including a sensing surface for sensing the luminous intensity distribution image formed on the optical focal plane; and a calculator for obtaining a distribution of luminous intensity of the measurement area based on the luminous intensity distribution image sensed by the image pickup unit.

2. An apparatus as defined in claim 1, wherein the ellipsoidal reflection surface extends over approximately 180° about the axis of rotational symmetry.

3. An apparatus as defined in claim 1, further comprising a relay lens system disposed in vicinity of the second focal point of the ellipsoidal reflection surface, the relay lens system directing the luminous intensity distribution image formed on the optical focal plane onto the sensing surface of the image pickup unit.

4. An apparatus as defined in claim 3, further comprising a member disposed in vicinity of the relay lens system, the member including an aperture which has the shape corresponding to the measurement area.

5. An apparatus as defined in claim 1, wherein the light source is a surface light source while the image pickup unit is disposed on the normal line of the measurement area, and further comprising a reflecting optical system disposed on an optical path between the ellipsoidal mirror and the image pickup unit, the reflecting optical system directing the light beams, which is emitted from the measurement area and then reflected from the ellipsoidal mirror, to the image pickup unit substantially along the normal line.

6. An apparatus as defined in claim 5, further comprising a controller, wherein the ellipsoidal mirror and the reflecting optical system are integrally rotatable about the normal line of the measurement area, wherein the controller controls the ellipsoidal mirror, the reflecting optical system and the image pickup unit so that the image pickup unit senses luminous intensity distribution images in the respective rotational positions while the ellipsoidal mirror and the reflecting optical system are rotated about the normal line, and wherein the calculator obtains a two-dimensional distribution of luminous intensity of the measurement area based on the sensed luminous intensity distribution images in the respective rotational positions.

7. An apparatus as defined in claim 6, further comprising a relay lens system disposed in vicinity of the second focal point of the ellipsoidal reflection surface, the relay lens system directing the luminous intensity distribution image formed on the optical focal plane onto the sensing surface of the image pickup unit, the relay lens system rotatable with the ellipsoidal mirror and the reflecting optical system about the normal line.

8. An apparatus as defined in claim 1, wherein the image pickup unit is capable of sensing the luminous intensity distribution images with different spectral sensitivities, and wherein the calculator obtains a color distribution of luminous intensity of the measurement area based on the luminous intensity distribution images sensed with the different spectral sensitivities.

9. An apparatus as defined in claim 1, further comprising a filter switching unit disposed on an optical path between the ellipsoidal mirror and the image pickup unit for selectively positioning one of filters having different spectral transmittances on the optical path, whereby luminous intensity distribution images are sensed with the different spectral sensitivities by the image pickup unit, wherein the calculator obtains a color distribution of luminous intensity of the measurement area based on the luminous intensity distribution images sensed with the different spectral sensitivities.

10. An apparatus as defined in claim 9, further comprising a controller, wherein the image pickup unit includes a full frame CCD for sensing the luminous intensity distribution images, wherein the controller controls the image pickup unit so that first to third operations are executed in this order every time the filter is selectively positioned, the first and third operations being of shifting electric charge images in parallel on the full frame CCD, the second operation being of interruption of shifting the electric charge images for a predetermined time to sensing the luminous intensity distribution image corresponding to the positioned filter, and wherein calculator obtains the color distribution of luminous intensity of the measurement area based on the luminous intensity distribution images sensed during the every second operation.

11. An apparatus as defined in claim 10, wherein the controller controls the image pickup unit so that all of the electric charge images formed on the full frame CCD by executing the every second operation are read out together after sensing all of the luminous intensity distribution images corresponding to the filters.

12. An apparatus as defined in claim 9, further comprising a member disposed on the optical focal plane, the member including an aperture which has the shape corresponding to the luminous intensity distribution image formed on the optical focal plane.

13. An apparatus as defined in claim 1, further comprising:

a member disposed on the optical focal plane, the member including an aperture which has the shape corresponding to the luminous intensity distribution image formed on the optical focal plane; and a dispersed image forming optical system for dispersing light beams, which is emitted from the measurement area, reflected from the ellipsoidal mirror, and then passes the aperture, to form a dispersed image of the luminous intensity distribution image on the sensing surface of the image pickup unit, the dispersed image forming optical system including an incident section located in vicinity of the second focal point, wherein the calculator obtains a spectral distribution of luminous intensity of the measurement area based on the dispersed image sensed by the image pickup unit.

14. An apparatus as defined in claim 13, wherein the dispersed image forming optical system includes:
- a lens system for directing the incident light beams upon the incident section onto the sensing surface of the image pickup unit, the lens system having an optical axis; and
- a wavelength dispersion unit for dispersing the incident light beams, the wavelength dispersion unit being symmetrical with respect to the optical axis of the lens system.

15. An apparatus as defined in claim 1, further comprising a reflecting member for reflecting light beams, which is emitted from the measurement area and then reflected from the ellipsoidal mirror, to directing toward the ellipsoidal mirror side,
  wherein the image pickup unit is disposed in opposite side of the reflecting member with respect to the ellipsoidal mirror.

16. An apparatus for measuring a spectral distribution of luminous intensity of a light source having a measurement area to be measured, comprising:
- an ellipsoidal mirror having an axis of rotational symmetry, and including an ellipsoidal reflection surface having first and second focal points, the ellipsoidal mirror being disposed so that the first focal point is positioned in vicinity of the measurement area, the ellipsoidal mirror reflecting parallel light beams from the measurement area onto an optical focal plane on which the reflected light beams are focused, whereby a luminous intensity distribution image of the measurement area is formed on the optical focal plane;
- a member disposed on the optical focal plane, the member including an aperture which has the shape corresponding to the luminous intensity distribution image formed on the optical focal plane;
- a dispersed image forming optical system for dispersing light beams, which is emitted from the measurement area, reflected from the ellipsoidal mirror, and then passes the aperture, to form a dispersed image of the luminous intensity distribution image on a predetermined image-forming position, the dispersed image forming optical system including an incident section located in vicinity of the second focal point,
- an image pickup unit including a sensing surface for sensing the dispersed image, the image pickup unit being disposed so that the sensing surface is located on the image-forming position; and
- a calculator for obtaining a spectral distribution of luminous intensity of the measurement area based on the dispersed image sensed by the image pickup unit.

17. An apparatus as defined in claim 16, wherein the ellipsoidal reflection surface extends over approximately 360° about the axis of rotational symmetry.

18. An apparatus as defined in claim 16, further comprising a member disposed in vicinity of the incident section, the member including an aperture which has the shape corresponding to the measurement area.

19. An apparatus as defined in claim 16, wherein the dispersed image forming optical system includes:
- a lens system for directing the incident light beams upon the incident section onto the sensing surface of the image pickup unit, the lens system having an optical axis, and
- a wavelength dispersion unit for dispersing the incident light beams, the wavelength dispersion unit being symmetrical with respect to the optical axis of the lens system.

20. An apparatus as defined in claim 19, wherein the wavelength dispersion unit is a transmission type diffraction grating.

21. An apparatus as defined in claim 19, wherein the wavelength dispersion unit is a conic prism.

22. An apparatus as defined in claim 19, wherein the dispersed image forming optical system further includes a restricting member for shielding a zero-order light beam emitted from the wavelength dispersion unit to eliminate a zero-order image from the dispersed images.

23. An apparatus as defined in claim 19, wherein the wavelength dispersion unit is a reflection type diffraction grating.

24. An apparatus as defined in claim 23, wherein the dispersed image forming optical system further includes a restricting member for reflecting light beams from the reflection type diffraction grating except a zero-order light beam to direct onto the image pickup unit.

25. An apparatus as defined in claim 16, further comprising a reflecting member for reflecting light beams, which is emitted from the measurement area and then reflected from the ellipsoidal mirror, to directing toward the ellipsoidal mirror side,
  wherein the dispersed image forming optical system is disposed in opposite side of the ellipsoidal mirror with respect to the reflecting member.

26. An apparatus as defined in claim 25, wherein the ellipsoidal reflection surface extends over approximately 180° about the axis of rotational symmetry.

27. An apparatus as defined in claim 16, further comprising an illumination unit for illuminating the measurement area and the ellipsoidal reflection surface,
  wherein the image pickup unit senses a first dispersed image formed by light beams from the measurement area and a second dispersed image formed by reflected light beams which are reflected from the measurement area when the illumination unit illuminates the measurement area, and
  wherein the calculator obtains a deviation spectral distribution of luminous intensity of the light beam reflected by the measurement area by calculating a ratio between a spectral distribution of luminous intensity of the measurement area obtained based on the first dispersed image and a spectral distribution of luminous intensity of the illumination unit obtained based on the second dispersed image.

28. An apparatus as defined in claim 27, wherein the illumination unit includes a light source for illuminating the measurement area and the ellipsoidal reflection surface; and a beam splitter for dividing the light beam emitted from the light source into two light beams to direct the divided light beam toward the measurement area and the ellipsoidal reflection surface, respectively.

29. A method of measuring a distribution of luminous intensity of a light source having a measurement area to be measured, comprising the steps of:
- preparing an ellipsoidal mirror having an axis of rotational symmetry, and including an ellipsoidal reflection surface having first and second focal points;
- disposing the ellipsoidal mirror so that the first focal point is positioned in vicinity of the measurement area to reflect parallel light beams from the measurement area onto an optical focal plane on which the reflected light beams are focused, whereby a luminous intensity distribution image of the measurement area is formed on the optical focal plane;

sensing the luminous intensity distribution image formed on the optical focal plane; and obtaining a distribution of luminous intensity of the measurement area based on the sensed luminous intensity distribution image.

30. A method of measuring a spectral distribution of luminous intensity of a light source having a measurement area to be measured, comprising the steps of:

preparing an ellipsoidal mirror having an axis of rotational symmetry, and including an ellipsoidal reflection surface having first and second focal points;

disposing the ellipsoidal mirror so that the first focal point is positioned in vicinity of the measurement area to reflect parallel light beams from the measurement area onto an optical focal plane on which the reflected light beams are focused, whereby a luminous intensity distribution image of the measurement area is formed on the optical focal plane;

disposing a member on the optical focal plane, the member including an aperture which has the shape corresponding to the luminous intensity distribution image formed on the optical focal plane;

dispersing light beams, which are emitted from the measurement area, reflected from the ellipsoidal mirror, and then passes the aperture, to form a dispersed image of the luminous intensity distribution image on a predetermined image-forming position;

sensing the dispersed image; and obtaining a spectral distribution of luminous intensity of the measurement area based on the sensed dispersed image.

* * * * *